United States Patent
Seok et al.

(10) Patent No.: US 11,658,538 B2
(45) Date of Patent: May 23, 2023

(54) MOTOR OPERATED COMPRESSOR

(71) Applicant: LG ELECTRONICS INC., Seoul (KR)

(72) Inventors: Hohyun Seok, Seoul (KR); Chanhyeok Park, Seoul (KR); Eunsub Lee, Seoul (KR); Myungkyun Kiem, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 214 days.

(21) Appl. No.: 17/113,334

(22) Filed: Dec. 7, 2020

(65) Prior Publication Data
US 2022/0181941 A1 Jun. 9, 2022

(51) Int. Cl.
| | | |
|---|---|---|
| H02K 3/52 | (2006.01) | |
| H02K 11/33 | (2016.01) | |
| F25B 31/02 | (2006.01) | |
| B60H 1/32 | (2006.01) | |
| H02K 21/16 | (2006.01) | |

(52) U.S. Cl.
CPC ........... H02K 3/522 (2013.01); B60H 1/3222 (2013.01); F25B 31/026 (2013.01); H02K 11/33 (2016.01); H02K 21/16 (2013.01); H02K 2203/09 (2013.01)

(58) Field of Classification Search
CPC .. H02K 3/00; H02K 3/12; H02K 3/28; H02K 3/50; H02K 3/52; H02K 3/522; H02K 5/00; H02K 5/04; H02K 5/17; H02K 5/173; H02K 5/22; H02K 5/225; H02K 11/33; B60H 1/3222; F25B 31/026; H01R 25/00; H01R 25/16
See application file for complete search history.

(56) References Cited

U.S. PATENT DOCUMENTS

| | | | | |
|---|---|---|---|---|
| 2009/0256439 | A1* | 10/2009 | Inoue | H02K 3/522 310/71 |
| 2012/0230851 | A1* | 9/2012 | Fukasaku | F04B 35/04 417/411 |

FOREIGN PATENT DOCUMENTS

| | | | | |
|---|---|---|---|---|
| EP | 3373422 | * | 9/2018 | ............... H02K 3/28 |
| JP | 2006-250145 | A | 9/2006 | |
| JP | 2006-291926 | A | 10/2006 | |
| JP | 2012-184752 | A | 9/2012 | |
| JP | 2018-023222 | A | 2/2018 | |
| JP | 2018-537607 | A | 12/2018 | |

(Continued)

*Primary Examiner* — Tran N Nguyen
(74) *Attorney, Agent, or Firm* — Birch, Stewart, Kolasch & Birch, LLP

(57) ABSTRACT

The present disclosure relates to a motor operated compressor, including a housing, a compressor provided in the housing, a motor connected to the compressor to drive the compressor, an inverter coupled to one side of the housing, and connected to the motor unit in an electrically conductive manner. The motor operated compressor includes a hermetic terminal assembly, one side of which extends into the inverter unit, and an opposite side of which extends into the housing. A plurality of busbars have one end of each busbar connected to the opposite side of the hermetic terminal assembly, and the other end of each busbar connected to the motor unit. A first insulating cover portion encloses and seals the hermetic terminal assembly and the plurality of busbars inside the housing, such that a conductive body connecting the motor unit and the inverter unit in the main housing is sealed from refrigerant.

10 Claims, 12 Drawing Sheets

(56) References Cited

FOREIGN PATENT DOCUMENTS

| KR | 10-2013-0057889 A | 6/2013 |
| KR | 10-2017-0017912 A | 2/2017 |
| KR | 10-1936102 B1 | 1/2019 |

\* cited by examiner

MOTOR OPERATED COMPRESSOR

BACKGROUND

1. Technical Field

The present disclosure relates to a scroll-type motor operated compressor driven by a motor.

2. Description of the Related Art

Compressors that compress refrigerant in vehicle air conditioning systems have been developed in various forms. In recent years, according to the trend of electrification of automobile parts, the development of motor operated compressors driven by electricity using a motor has been actively carried out.

A motor operated compressor mainly employs a scroll compression method suitable for a high compression ratio operation. Such a scroll type motor operated compressor (hereinafter, referred to as a "motor operated compressor") is composed of an electric motor unit, a compression unit, and a rotation shaft connecting the electric motor unit and the compression unit.

The electric motor unit is provided with a rotary motor or the like and provided inside the sealed casing. The compression unit is located on one side of the electric motor unit, and is composed of a fixed scroll and an orbiting scroll. The rotation shaft is configured to transmit a rotational force of the electric motor unit to the compression unit.

In recent years, a "low-voltage high-current" type motor operated compressor has been developed with low voltage and high current of input power. This is due to an advantage of a low-voltage high-current method capable of charging in a short time, considering that a motor operated compressor is provided in a vehicle.

A drive motor made of a three-phase induction electric motor is mainly applied to the electric motor unit of the motor operated compressor. In such a drive motor, three coils are drawn out from the end coils of the drive motor in order to receive three-phase (U, V, W phase) power from an inverter, which is a motor drive circuit, and terminals are respectively provided at an end portion of each of the drawn coils. The three terminals are detachably coupled to a motor-side terminal housing provided in an insulating housing of the drive motor.

Furthermore, an inverter-side terminal housing is provided in the inverter, and three output terminals are provided inside the inverter-side terminal housing. Therefore, a connection terminal for transferring three-phase power from the inverter to the drive motor is required between the inverter and the drive motor. This connection terminal is typically referred to as a 3-phase hermetic terminal.

A hermetic terminal is as disclosed in Korean Patent Publication No. 10-2013-0057889, Jun. 3, 2013. The hermetic terminal disclosed in this reference has a shape in which a terminal connector is located between a side surface of a coil and an upper surface of a core, and does not protrude in an axial direction than the coil.

However, in the hermetic terminal as described above, a terminal connector to which a terminal and a coil is coupled may be located on a side surface of the coil, and thus an insulating area may be extended by being away from the coil, but a metal may still be exposed at a coupling portion between the terminal and the coil, and as a result, insulation may be destroyed by refrigerant and oil flowing into an inlet port.

In addition, a conventional hermetic terminal is as disclosed in Korean Patent Registration No. 10-1936102, Jan. 2, 2019. The conventional hermetic terminal has a structure in which a terminal slot is provided in a terminal housing extending in an axial direction from an outer circumferential surface of a stator, and a cover is assembled after assembling a coil in the terminal slot.

However, in the hermetic terminal as described above, gas or liquid phase refrigerant and oil may still flow into an assembly portion of the terminal and the slot, and insulation may be destroyed.

SUMMARY

An aspect of the present disclosure is to provide a motor operated compressor having a high insulation resistance by enclosing and sealing a hermetic terminal assembly and a busbar connecting an inverter unit and a motor unit in an electrically conductive manner so as not to allow a metal portion to be exposed to refrigerant or oil inside a main housing.

An aspect of the present disclosure is to provide a motor operated compressor capable of reducing a volume of an insulating member enclosing a plurality of busbars by arranging a plurality of busbars connecting a hermetic terminal assembly and a motor unit so as to overlap in an axial direction.

Furthermore, an aspect of the present disclosure is to provide a motor operated compressor that does not expose a metal portion to refrigerant or oil, and has a high insulation resistance by sealing and connecting a lead wire of a winding coil wound on a motor unit and a connection portion of a busbar in an insulating cover portion disposed to protrude in an axial direction from an outer circumference at one side of a motor unit.

In addition, an aspect of the present disclosure is to provide a motor operated compressor that prevents refrigerant or oil inside a main housing from flowing into an inverter unit by blocking and sealing a through hole disposed at one side of a main housing to accommodate a hermetic terminal assembly with a sealing member and a plate.

In addition, an aspect of the present disclosure is to provide a motor operated compressor that double-blocks refrigerant or oil inside a housing from flowing into an inverter unit by defining a secondary sealing member at a step portion that supports a sealing member.

Moreover, an aspect of the present disclosure is to provide a motor operated compressor with an improved sealing force of a secondary sealing member by defining a step in a sealing groove into which the secondary sealing member is inserted.

Besides, an aspect of the present disclosure is to provide a motor operated compressor provided with a separation prevention wall between a bolt hole disposed at one side of a main housing to accommodates a bolt that fixes a plate and a step portion that supports a sealing member, thereby preventing the sealing member from being separated.

In order to achieve the objectives of the present disclosure, the following solutions are provided.

In order to achieve the objectives of the present disclosure, there may be provided a motor operated compressor, including a hermetic terminal assembly, one side of which is exposed into the inverter unit, and the other side of which is exposed into the housing between a motor unit and an inverter unit, a plurality of busbars, one end of which is connected to the other side of the hermetic terminal assembly, and the other end of which is connected to the motor unit, and a first insulating cover portion enclosing and sealing the hermetic terminal assembly and the plurality of busbars inside the housing.

Here, at least part of the plurality of busbars may be arranged to overlap in an axial direction.

Furthermore, the plurality of busbars may include a first busbar having an axial extension portion and a radial extension portion, a second busbar having an axial extension portion and a radial extension portion, and a third busbar having an axial extension portion and a radial extension portion, wherein a length of the axial extension portion of the second busbar is larger than that of the first busbar and smaller than that of the third busbar, and a length of a circumferential extension portion of the second busbar is larger than that of the first busbar and smaller than that of the third busbar.

Here, the hermetic terminal assembly may include a body member provided inside the housing, and inserted into a through hole provided in the housing, one side of which faces the inverter unit and the other side of which faces an inside of the housing, a hollow insulating member passing through the body member, and a conductive member enclosed by the insulating member, one end of which protrudes from one side of the body member, and the other end of which protrudes from the other side of the body member to be connected to one end of the busbar, wherein the first insulating cover portion encloses the body member along an outer circumferential surface thereof to seal the other side of the body member.

Furthermore, the plurality of busbars may be respectively provided with a connection portion connected to a lead wire of a winding coil provided in the motor unit, and an end portion of the connection portion may be exposed to an outside of the first insulating cover portion.

Here, an end portion of the connection portion may be enclosed and sealed by a second insulating cover portion.

Furthermore, the second sealing portion may include an outer wall portion protruding from an outer circumference of one side of the motor unit toward the inverter unit and disposed with a receiving groove that accommodates an end portion of the connection portion, and a sealing cover coupled to the outer wall portion, wherein the end portion of the connection portion is sealed by the first insulating cover portion, the sealing cover, and the outer wall portion.

Here, a coupling protrusion portion protruding in an axial direction may be disposed at the outer wall portion, and a coupling concave portion recessed in an axial direction may be disposed at the sealing cover to be coupled to each other.

In addition, in order to achieve the objectives of the present disclosure, there may be provided a motor operated compressor, including a plate disposed with a plate hole that accommodates the insulating member to cover the through hole, a first annular step portion recessed to a predetermined depth along an outer circumference of the through hole at one side of the housing, a second annular step portion recessed to a predetermined depth along an outer circumference of one side of the body member, and a first annular sealing member, an outer circumferential side of one side surface of which is supported by the first step portion, and an inner circumferential side of one side surface of which is supported by the second step portion, and the other side in a direction opposite to one side surface of which is supported by the plate.

Furthermore, annular sealing grooves may be disposed in the first step portion and the second step portion, respectively, and second annular second sealing members may be inserted into the annular sealing grooves, respectively.

Here, a height of an inner surface of the annular sealing groove disposed in the first step portion may be lower than that of an outer surface thereof, and a height of an outer surface of the annular sealing groove disposed in the second step portion may be lower than that of an inner surface thereof.

Here, a first bolt hole spaced apart by a predetermined distance from the first step portion may be disposed at one side of the housing, and a second bolt hole corresponding to the first bolt hole may be disposed on the plate, and the plate may be coupled to the housing by bolts accommodated in the first and second bolt holes.

Furthermore, a separation prevention wall may be disposed between the first step portion and the first bolt hole.

Moreover, in order to achieve the objectives of the present disclosure, there may be provided a motor operated compressor, including a hermetic terminal assembly, one side of which is exposed into the inverter unit, and the other side of which is exposed into the housing between a motor unit and an inverter unit, a plurality of busbars, one end of which is connected to the other side of the conductive member, and the other end of which is connected to the motor unit, and an insulating cover portion inserted into a through hole disposed at the housing to allow one side thereof to face the inverter unit so as to enclose and seal the plurality of conductive members, the plurality of insulating members, and the plurality of busbars inside the housing.

Furthermore, each of the plurality of busbars may be provided with a connection portion connected to a lead wire of a winding coil provided in the motor unit, and an end portion of the connection portion may be exposed to an outside of the insulating cover portion.

Here, the motor operated compressor may include an outer wall portion protruding from an outer circumference of one side of the motor unit toward the inverter unit, and disposed with a receiving groove that accommodates an end portion of the connection portion, and a sealing cover coupled to the outer wall portion, wherein an end portion of the connection portion is sealed by the insulating cover portion, the sealing cover, and the outer wall portion.

Furthermore, the motor operated compressor may include a plate disposed with a plate hole that accommodates the insulating member to cover the through hole, a first annular step portion recessed to a predetermined depth along an outer circumference of the through hole at one side of the housing, a second annular step portion recessed to a predetermined depth along an outer circumference of one side of the insulating cover portion, and a first annular sealing member, an outer circumferential side of one side surface of which is supported by the first step portion, and an inner circumferential side of one side surface of which is supported by the second step portion, and the other side in a direction opposite to one side surface of which is supported by the plate.

A motor operated compressor according to the present disclosure may include a hermetic terminal assembly connecting an inverter unit and a motor unit in an electrically conductive manner and a busbar connected thereto to wrap and seal the hermetic terminal assembly exposed inside a main housing and the busbar connected thereto with a first insulating cover portion along an outer circumferential surface, thereby preventing a conductive member of the hermetic terminal assembly and the busbar formed of a metal having conductivity from being exposed within the main housing. The exposure of a metal portion may be prevented, thereby providing a high insulation resistance.

Furthermore, in a motor operated compressor according to the present disclosure, a hermetic terminal assembly and a motor unit may be connected by a plurality of busbars extending in axial and circumferential directions, and portions extending in a circumferential direction of the plurality of busbars may be arranged to overlap each other in an axial direction, thereby reducing a volume of a first insulating cover portion enclosing the busbars to reduce production cost and downsize the compressor.

In addition, in a motor operated compressor according to the present disclosure, a lead wire of a winding coil wound on a motor unit and a connection portion of a busbar may be sealed in an accommodation groove inside a second insulating cover portion disposed to protrude in an axial direction from an outer circumference at one side of a motor unit, thereby preventing the connection portion of the busbar from being exposed inside a main housing. The exposure of a metal portion may be prevented, thereby providing a high insulation resistance.

Moreover, a motor operated compressor according to the present disclosure may cover a through hole of a main housing with a plate, and insert a primary sealing member into a space consisting of the plate, a first step portion disposed in the main housing, and a second step portion disposed in a hermetic terminal assembly to seal the space, thereby preventing refrigerant or oil inside the main housing from flowing into an inverter unit to come into contact with a conductive member protruding toward the inverter unit. Through this, it may be possible to provide high insulation resistance.

Besides, a motor operated compressor according to the present disclosure may define a secondary sealing member at first and second step portions supporting a sealing member to prevent refrigerant or oil inside a main housing from leaking into a gap of a primary sealing member, thereby improving a sealing effect between the main housing and the inverter unit. Through this, it may be possible to prevent refrigerant or oil inside the main housing from flowing into an inverter unit to come into contact with a conductive member protruding toward the inverter unit, and to provide high insulation resistance.

Furthermore, a motor operated compressor according to the present disclosure may define a step such that an axial height of a surface into which refrigerant flows is lower between both side surfaces facing a sealing groove into which a secondary sealing member is inserted to pressurize the secondary sealing member by a pressure of the refrigerant, thereby improving the sealing effect of the secondary sealing member.

In addition, a motor operated compressor according to the present disclosure may be provided with a separation prevention wall between a bolt hole disposed at one side of a main housing to accommodates a bolt that fixes a plate and a step portion that supports a sealing member, thereby preventing the sealing member from being dragged into the bolt hole and damaged, and preventing the sealing member from being separated into the bolt hole and damaged by a pressure of refrigerant inside the main housing.

DETAILED DESCRIPTION OF THE EMBODIMENTS

Prior to describing the present disclosure, terms to be used below will be described.

The term "annular shape" used in the present disclosure denotes a shape having an inner circumference and an outer circumference. For example, the outer circumference and the inner circumference may have different curvatures, and may have a polygonal outer circumference and a circular inner circumference.

Furthermore, the term "axial direction" used in the present disclosure denotes a length direction of a rotation shaft 330 or a length direction of a main housing 110 to be described later.

In addition, the term "circumferential direction" used in the present disclosure is a direction of rotation along a circular side surface of the cylindrical main housing 110 to be described later, which may be clockwise or counterclockwise.

In addition, the term "radial direction" used in the present disclosure denotes a direction from a rotation shaft to be described later toward a circular side surface of the cylindrical main housing 110.

Hereinafter, a motor operated compressor according to the present disclosure will be described in detail with reference to an embodiment illustrated in the accompanying drawings.

Figure 1:
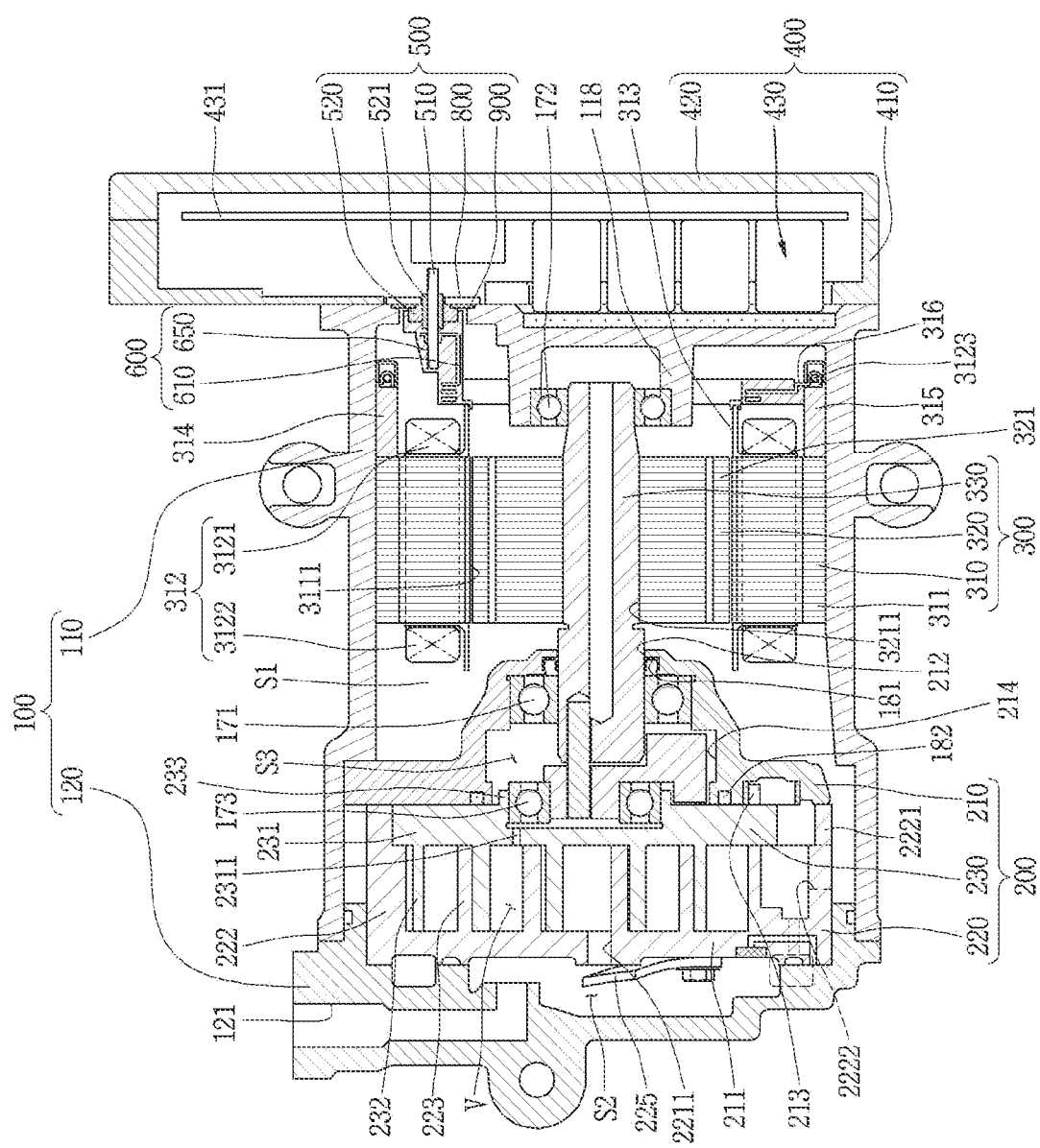
FIG. 1 is a cross-sectional view showing a motor operated compressor according to the present disclosure.

FIG. 1 is a sectional view shown an inside of a motor operated compressor according to the present disclosure. FIG. 1 illustrates a motor operated compressor using refrigerant 134A as an example, but may also be applicable to a motor operated compressor using carbon dioxide ($CO_2$) refrigerant.

Referring to FIG. 1, a motor operated compressor according to an embodiment of the present disclosure includes a housing 100, a compression unit 200, a motor unit 300, an inverter unit 400, and a hermetic terminal assembly 500.

The housing 100 defines an appearance of a motor operated compressor. An inner space of the housing 100 is sealed, and the compression unit 200 and the motor unit 300, and part of the hermetic terminal assembly 500 are accommodated in the inner space of the housing 100. The inverter unit 400 is provided outside the housing 100 and is electrically connected to the motor unit 300 using the hermetic terminal assembly 500.

As the housing 100 is disposed in a transverse direction with respect to the ground, the compression unit 200 and the motor unit 300 are arranged along the transverse direction, the compression unit 200 and the motor unit 300 are disposed at the rear side and at the front side, respectively. The right side of FIG. 1 is defined as the front side, and the left side is defined as the rear side.

Referring to FIG. 1, the housing 100 according to an embodiment of the present disclosure includes a main housing 110 defining a motor chamber (S1), and a rear housing 120 defining a discharge chamber (S2), and an oil separation chamber. A rear end of the main housing 110 and a front end of the rear housing 120 are coupled to each other to seal an inner space of the housing 100.

The main housing 110 is disposed with an intake port (not shown) to pass therethrough so as to communicate with the motor chamber (S1). The intake port is disposed to pass through a front vicinity of the main housing 110 in a direction of the inverter unit 400 with respect to the compression unit 200. Accordingly, refrigerant sucked into the motor chamber (S1) through the intake port is sucked into the compression unit 200 through the motor unit 300.

The rear housing 120 is coupled to the main housing 110 at a rear side of the fixed scroll 220 to be described later. The rear housing 120 is disposed with an exhaust port 121 communicating with the oil separation chamber to discharge oil-separated refrigerant to a condensation port (not shown). Accordingly, refrigerant discharged to the discharge chamber (S2) is discharged to an outside of the compressor through the exhaust port 121 after separating oil in the oil separation chamber.

Next, the compression unit 200 according to an embodiment of the present disclosure will be described.

Referring to FIG. 1, the compression unit 200 according to an embodiment of the present disclosure includes a frame 210, a fixed scroll (or first scroll) 220 fixed to the frame 210, and an orbiting scroll (or second scroll) 230 provided between the frame 210 and the fixed scroll 220.

The frame 210 is fixedly provided in the middle of the main housing 110. The frame 210 is provided at a rear side of the motor unit 300 to support the rotation shaft 330 to be described later in a radial direction while at the same time supporting the orbiting scroll 230 in an axial direction.

The frame 210 is defined in a disk shape. The frame 210 may be fixed by welding to the main housing 110, or may be fixed between the main housing 110 and the rear housing 120 using a fastening force between the two housings 110, 120.

A bearing receiving portion 211 accommodating a main bearing 171 is disposed at the center of a rear surface of the frame 210, and a shaft receiving hole 212 accommodating the rotation shaft 350 is disposed at the center of the bearing receiving portion 211 to pass therethrough in an axial direction.

Here, the main bearing 171 may be configured with a bush bearing, but may be configured with a deep groove ball bearing as shown in FIG. 1. As the main bearing 171 is configured with a ball bearing, the rotation shaft 330 passing through the shaft receiving hole 212 of the frame 210 is supported in radial and axial directions by the main bearing 171.

Furthermore, a first sealing member 181 is inserted into a front end of the shaft receiving hole 212. The first sealing member 181 is defined in a U-shaped cross-sectional shape, and is defined in an annular shape so as to wrap an outer circumferential surface of the rotation shaft 330. Accordingly, the first sealing member 181 seals a second sealing member 182 and a back pressure chamber (S3) described later.

In addition, refrigerant sucked into the motor chamber (S1) of the main housing 110 is guided to the compression unit 200 through an edge of the frame 210. Accordingly, refrigerant sucked into the motor chamber (S1) is sucked into the compression chamber (V).

Furthermore, an anti-rotation mechanism 213 for preventing the rotation of the orbiting scroll 230 is provided between a bearing receiving portion 214 and a suction guide groove 2221 on a rear surface of the frame 210. An oldham ring or pin-and-ring structure may be applicable to the anti-rotation mechanism. Since this is a technology widely known in the motor operated compressor, a detailed description thereof will be omitted.

Referring to FIG. 1, the fixed scroll 220 is fixed between the main housing 110 and the rear housing 120 together with the frame 210, and the orbiting scroll 230 is coupled to the rotation shaft 330 to perform an orbiting motion between the frame 210 and the fixed scroll 220. Accordingly, the fixed scroll 220 is fixedly coupled to the housing 100 to define a compression chamber (V) including a pair of two suction pressure chambers, intermediate pressure chambers, and discharge pressure chambers together with the orbiting scroll 230.

The fixed scroll 220 according to an embodiment of the present disclosure includes a fixed end plate portion 221, a side wall portion 222, and a fixed wrap 223.

The fixed end plate portion 221 is defined in a substantially disk shape. However, a fastening groove portion (not shown) may be disposed on an outer circumferential surface of the fixed end plate portion 221 so that a fastening protrusion portion (no reference numeral) protruding to an inner circumferential surface of the housing 100 is engaged and inserted.

Furthermore, a discharge port 2211 is disposed in the vicinity of the center of the fixed end plate portion 221. The discharge port 2211 discharges refrigerant from the discharge pressure chamber, which is a final compression chamber, to the discharge chamber (S2), and a check valve 225 for opening or closing the discharge port 2211 is provided on a rear surface of the fixed end plate portion 221.

The side wall portion 222 is formed in an annular shape by extending a preset height along a circumferential direction from a front edge of the fixed end plate portion 221. The suction guide groove 2221 is disposed along an axial direction on an outer circumferential surface of the side wall portion 222, and a suction port 2222 passing through the side wall portion 222 is disposed in the middle of the suction guide groove 2221.

In addition, an axial height of the side wall portion 222 is disposed higher than that of the fixed wrap 223 to be described later, and an inner diameter of the side wall portion 222 is formed larger than an outer diameter of an orbiting end plate portion 231. Accordingly, the orbiting scroll 230 is inserted into the side wall portion 222 of the fixed scroll 220 to perform an orbiting motion.

The fixed wrap 223 is disposed to integrally extend from a front surface of the fixed end plate portion 221. The fixed wrap 223 may be defined in various ways, such as an involute shape, a logarithmic spiral shape, or a non-involute shape, like the orbiting wrap 232 to be described later. This is a technology well known in the motor operated compressor, and thus a detailed description thereof will be omitted.

Referring to FIG. 1, the orbiting scroll 230 is inserted into the frame 210 and supported in an axial direction, and includes an orbiting end plate portion 231 and an orbiting wrap 232.

The orbiting end plate portion 231 is defined in a substantially disk shape. An outer diameter of the orbiting end plate portion 231 is defined smaller than an inner diameter of the sidewall portion 222 of the fixed scroll 220. Accordingly, the orbiting scroll 230 is inserted into the fixed scroll 220. However, this may differ depending on the type of compressor. For example, the orbiting end plate portion 231 may be formed larger than an inner diameter of the side wall portion 222 of the fixed scroll 220 to define a front surface and a thrust surface of the side wall portion 222 of the fixed scroll 220.

In addition, the orbiting wrap 232 engaged with the fixed wrap 223 is disposed on a rear surface of the orbiting end plate portion 231. Accordingly, a rear surface of the orbiting end plate portion 231 defines a compression chamber (V) together with the orbiting wrap 232. The compression chamber (V) is defined such that the suction pressure chamber, the intermediate pressure chamber, and the discharge pressure chamber are continuously connected from the outside to the inside.

The second sealing member 182 for radially sealing a space between the frame 210 and the orbiting end plate portion 231 is coupled to a front edge of the orbiting end plate portion 231. The second sealing member 182 seals the back pressure chamber (S3) together with the first sealing member 181 described above.

A back pressure hole 2311 for communicating the intermediate pressure chamber with the back pressure chamber (S3) is disposed in a central portion of the orbiting end plate portion 231. Accordingly, refrigerant and oil move between the back pressure chamber (S3) and the intermediate pressure chamber (V) according to a difference between the pressure of the back pressure chamber (S3) and the pressure of the intermediate pressure chamber (V).

The orbiting wrap 232 is disposed to integrally extend from a rear surface of the orbiting end plate portion 231. Similar to the fixed wrap 223 described above, the orbiting wrap 232 may be defined in various ways according to the shape of the compressor, such as an involute shape, a logarithmic spiral shape, or a non-involute shape. For this, similar to the fixed wrap, a detailed description thereof will be omitted.

Furthermore, a boss portion 233 is disposed at the center of a front surface of the orbiting end plate portion 231, and an eccentric bearing 173 is inserted and coupled to the boss portion 233. A bush bearing or a ball bearing may be applicable to the eccentric bearing 173.

Next, a motor unit according to an embodiment of the present disclosure will be described.

The motor unit 300 according to an embodiment of the present disclosure is accommodated in the motor chamber (S1) of the main housing 110 to provide power for compressing refrigerant in the compression unit 200. The motor unit 300 is operated by power applied from the inverter unit 400 and may be controlled by a control signal. The motor unit 300 is electrically connected to the inverter unit 400 by the hermetic terminal assembly 500 to be described later. This will be described later.

Referring to FIG. 1, the motor unit 300 according to an embodiment of the present disclosure is connected to the compression unit 200 by the rotation shaft 330 to be described later. One end of the rotation shaft 330 is coupled to a rotor 320 of the motor unit 300 to be described later, and the other end thereof is coupled to the orbiting scroll 230. Accordingly, a rotational force generated from the motor unit 300 may be transmitted to the orbiting scroll 230 of the compression unit 200 by the rotation shaft 330.

The motor unit 300 includes a stator 310 fixed to the housing 100 and a rotor 320 rotatably provided in the stator 310.

The stator 310 forms an electromagnetic field by power applied from the inverter unit 400. The rotor 320 is rotated by the electromagnetic field formed by the stator 310 to generate a rotational force for rotating the orbiting scroll 230 of the compression unit 200.

The stator 310 includes a stator core 311, a winding coil 312 wound around the stator core 311, and an inner wall portion 313 insulating between the stator core 311 and the winding coil 312.

The stator core 311 is fixedly provided on an inner circumferential surface of the main housing 110 constituting the motor chamber (S1). Accordingly, the stator 310 does not rotate itself even when power and control signals are applied from the inverter unit 400.

The stator core 311 is defined in a cylindrical shape by stacking a plurality of thin electrical steel sheets in an annular shape in an axial direction. Accordingly, the stator core 311 is defined in a hollow shape to have a rotor receiving portion 3111 at the center thereof. The rotor 320 is rotatably inserted into the rotor receiving portion 3111.

Furthermore, a plurality of teeth in a circumferential direction are continuously arranged with a slit interposed therebetween on an inner circumferential surface of the stator core 311. A three-phase coil is wound on the teeth in a concentrated or distributed winding to constitute a winding coil 312.

The winding coil 312 has end coils 3121, 3122 disposed at both ends of the stator core 311 in an axial direction, and a three-phase coil is drawn out from the front end coil 3121 between both end coils. End portions of the drawn three-phase coil 3123 are respectively coupled to connection portions of a busbar to be described later, and the busbar is enclosed and sealed by first and second insulating cover portions to be described later, and the first insulating cover portion is engaged with and fixed to an inner wall portion extending in an axial direction on an inner circumferential surface of the stator. This will be described later.

A coil insulating member 313, 314, 315 is typically referred to as insulators, and is formed of an insulating material such as plastic. The coil insulating member 313, 314, 315 passes through the stator core 311 or is coupled to both ends of the stator core 311, respectively.

When coupled to both ends of the stator core 311, one side of the coil insulating member 313, 314, 315 is inserted into and coupled to each slit (not shown), and the other side thereof is axially extended from inner and outer circumferential surfaces, respectively, to constitute an inner wall portion 313 and outer wall portions 314, 315. The winding coil 312 passes through a slot between the inner wall portion 313 and the outer wall portions 314, 315 and is wound on each tooth.

A hermetic terminal assembly 500, a busbar 610, and a first insulating cover portion 650, which will be described later, may be engaged with and coupled to the inner wall portion 313 and the outer wall portions 314, 315 positioned at the front side. The three-phase coil 3123 described above is coupled to the connection portion of the busbar 610.

One side of the hermetic terminal assembly 500 protrudes into the inverter unit 400, and the other side thereof protrudes into the main housing 110, and the busbar 610 is connected in an electrically conductive manner between the hermetic terminal assembly 500 and the motor unit 300. Inside the main housing 110, the hermetic terminal assembly 500 and the busbar 610 are enclosed and sealed by the first insulating cover portion 650.

The rotor 320 is disposed to be spaced apart from the stator 310 by a preset air gap. Accordingly, while the stator 310 is fixed, the rotor 320 may be rotated by an electromagnetic field.

The rotor 320 includes a rotor core 321 and a permanent magnet (not shown).

The rotor core 321 is formed by stacking a plurality of thin electrical steel sheets in an annular shape in an axial direction like the stator core 311. The rotor core 321 is defined in a hollow shape to define a rotation shaft receiving portion 3211 at the center thereof.

A plurality of permanent magnets are embedded and coupled around the rotation shaft receiving portion 3211, and a magnetic path barrier (not shown) is disposed around the center of the permanent magnets or around an end portion of the permanent magnets. Accordingly, the rotor is rotated by an electromagnetic field formed by the winding coil 312 of the stator 310 when power is applied from the inverter unit 400.

The rotation shaft 330 is heat-fitted to the rotation shaft receiving portion 3211. Depending on the type of the compressor, both ends of the rotation shaft 330 may be supported in a radial direction with the motor unit 300 interposed therebetween, or may be supported in a radial direction at one side of the motor unit 300. FIG. 1 is a structure in which the rotation shaft 330 is supported on both sides of the motor unit 300.

Next, an inverter unit according to an embodiment of the present disclosure will be described.

Referring to FIG. 1, an inverter unit 400 according to an embodiment of the present disclosure applies or releases power and control signals to or from the motor unit 300 to control the operation of the motor operated compressor 10. The inverter unit 400 receives power and control signals from the outside to transmit them to the motor unit 300. Accordingly, the inverter unit 400 is connected to the motor unit 300 in an electrically conductive manner. The hermetic terminal assembly 500 for energizing the inverter unit 400 and the motor unit 300 will be described later.

The inverter unit 400 according to the present embodiment is provided at a front side of the main housing 110. However, the inverter unit 400 is not necessarily provided only on the front side of the main housing 110. For example, the inverter unit 400 may be provided on a side surface of the main housing 110. In other words, the inverter unit 400 may be provided at any position as long as electricity is conducted to the motor unit 300.

Furthermore, power and control signals may be applied to an inside of the inverter unit 400. In order to prevent unnecessary electrical conduction from the outside and noise of the control signals from being generated, the exterior of the inverter unit 400 may be formed of an insulating material. As an example, a member forming the exterior of the inverter unit 400 may be formed of synthetic resin or the like.

The inverter unit 400 according to an embodiment of the present disclosure includes an inverter housing 410, an inverter cover 420 and an inverter unit 430.

The inverter housing 410 is coupled to the inverter cover 420 to define an outside of the inverter unit 400. The inverter housing 410 is coupled to a front side of the main housing 110. As a rear side of the inverter housing 410 is opened, the inverter housing 410 is covered by a front side of the main housing 110. A rotation shaft support portion 118 may be provided at the center of a front surface of the main housing 110 facing the motor unit 300, and a through hole 114 (shown in FIG. 6) may be disposed at a front edge of the main housing 110 to insert the hermetic terminal assembly 500, which will be described later, thereinto. This will be described again later.

The inverter cover 420 is coupled to the inverter housing 410, and the inverter housing 410 is coupled to a front side of the main housing 110. Accordingly, an inverter chamber is disposed between the inverter cover 420, the inverter housing 410, and a front side of the main housing 110 to accommodate the inverter unit 430.

In addition, the inverter cover 420, the inverter housing 410, and the main housing 110 may be coupled by a separate fastening member (not shown). The shape of the inverter cover 420 and the main housing 110 is preferably to correspond to that of the inverter housing 410.

The inverter unit 430 includes a printed circuit board (PCB) 431, a semiconductor device (no reference numeral) attached to the printed circuit board 431, and a terminal coupling module (no reference numeral).

The basic structure, coupling relationship, and operation of the printed circuit board 431, the semiconductor device, and the terminal coupling module are widely known in the inverter compressor, and thus a description thereof will be omitted.

Next, a hermetic terminal assembly, a busbar, and a first insulating cover portion according to an embodiment of the present disclosure will be described.

The hermetic terminal assembly 500, the busbar 610, and the first insulating cover portion 650 according to an embodiment of the present disclosure will be described with reference to FIGS. 2A-3C. For convenience of explanation, a front side of FIG. 1 denotes a lower side of FIGS. 2A-3C, and a rear side of FIG. 1 denotes an upper side of FIGS. 2A-3C.

Figure 2A:
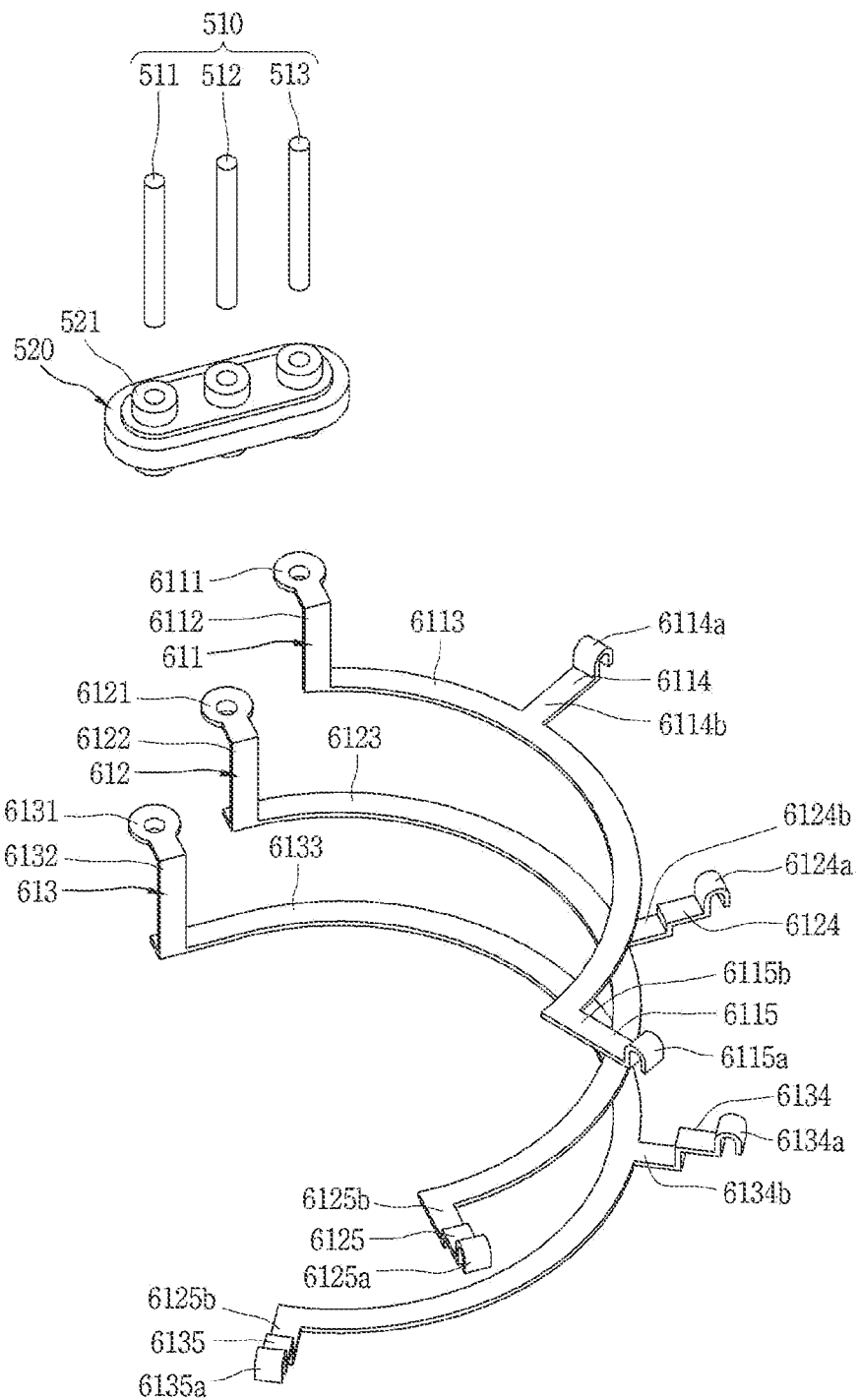
FIG. 2A is a perspective view showing a three-phase hermetic terminal of a motor operated compressor according to the present disclosure.

FIG. 2A is an exploded perspective view showing an exploded view of the hermetic terminal assembly 500 and the busbar 610 in a motor operated compressor according to an embodiment of the present disclosure.

The hermetic terminal assembly 500 according to an embodiment of the present disclosure includes a plurality of conductive members 510, hollow insulating members 521 enclosing the plurality of conductive members 510, and a body member 520 accommodating the hollow insulating members 521.

The conductive members 510 may be defined in a cylindrical shape. In addition, the conductive member may have a shape in which one end portion and the other end portion thereof may be enclosed in the hollow insulating member 521 having a polygonal column shape or a pin shape to protrude into the inverter unit 400 and the main housing 110, respectively.

The hollow insulating member 521 has as a shape having an inner circumferential surface and an outer circumferential surface, and the conductive member 510 is enclosed by the inner circumferential surface of the insulating member 521. The conductive member 510 is supported in a radial direction by the inner circumferential surface of the insulating member 521.

The body member 520 accommodates the hollow insulating members 521 surrounding a plurality of insulating members, and the conductive member 510 and the hollow insulating member 521 are inserted into the body member so that one side thereof protrudes to the inverter unit 400 and the other side thereof protrudes into the main housing 110. In other words, one end portion of the conductive member 510 protrudes from a front side of the body member 520, and the other end portion thereof protrudes from a rear side of the body member 520.

In an embodiment according to the present disclosure, in order to receive three-phase (U, V, W phase) power from an inverter that is a motor driving circuit, the plurality of conductive members 510 may include first, second and third conductive members 511, 512, 513 connected to three phases, respectively. The first, second, and third conductive members 511, 512, 513 are accommodated in the hollow insulating member 521 so that one end thereof is exposed to the inverter unit 400, and the other end thereof is exposed to the main housing. In other words, one end portion of the first, second, and third conductive members 511, 512, 513 protrudes to a front side of the body member 520, and the other end portion protrudes to a rear side of the body member 520.

The conductive member 510 protruding toward a front side of the hermetic terminal assembly 500 is connected to the inverter unit 400 in an electrically conductive manner, and the conductive member 510 protruding toward a rear side of the hermetic terminal assembly 500 is connected to one side of the busbar 610 located inside the main housing 110 in an electrically conductive manner, and the other side of the busbar 610 is connected to the motor unit 300 in an electrically conductive manner. Through this, the inverter unit 400 and the motor unit 300 are connected in an electrically conductive manner.

The busbar 610 is disposed in a plural, and the plurality of busbars 610 include a plurality of receiving portions accommodating the other end portions of the plurality of conductive members 510 to extend from the plurality of receiving portions in axial and circumferential directions. In other words, the plurality of busbars 610 may include a plurality of connecting portions extending in an axial direction at different lengths, and extending in a circumferential direction at different lengths from the plurality of receiving portions. A connection portion is disposed to extend in a radial direction from an end portion or the middle of the connecting portion, and the connection portion is connected to the motor unit in an electrically conductive manner. A plurality of connection portions may be arranged to extend in a radial direction from one connection portion.

In an embodiment of the present disclosure, the plurality of busbars 610 may include first, second, and third busbars 611, 612, 613. The first, second, and third busbars 611, 612, 613 are provided with first, second and third receiving portions 6111, 6121, 6131 capable of accommodating first, second, and third conductive members 511, 512, 513, respectively, from which first, second, and third vertical extension portions 6112, 6122, 6132 extend in an axial direction, and first, second, and third horizontal extension portions 6113, 6123, 6133 extend in a circumferential direction from end portions of the first, second, and third vertical extension portions 6112, 6122, 6132, respectively.

The first receiving portion 6111 is defined in an annular shape to accommodate the other end of the first conductive member 511, and a diameter of an inner circumferential surface of the first receiving portion 6111 is disposed to be the same as or slightly smaller than that of the first conductive member 511. Through this, the first conductive member 511 is press-fitted so as to be firmly fixed to the first receiving portion 6111, thereby preventing the connecting portion from being separated therefrom. Then, when current flows to the connecting portion, it is possible to prevent the connecting portion from overheating. The second and third receiving portions 6121, 6131 are defined to be the same as the first receiving portion 6111.

The first vertical extension portion 6112 extends in an axial direction from the first receiving portion 6111. In other words, the first vertical extension portion 6112 extends rearward from the first receiving portion 6111. The first horizontal extension portion 6113 extends in a circumferential direction from a rear end portion of the first vertical extension portion 6112. In other words, the first horizontal extension portion 61113 extends along the outer wall portion 315 extending in an axial direction from a front end portion of the stator 310.

The first vertical extension portion 6112 may be configured with a rectangular plate consisting of a short side and a long side, and the first horizontal extension portion 6113 may be configured with a plate consisting of a short side and a long side curved along a circumferential direction.

For convenience, a height of the plate is referred to as a thickness, and a length of the short side of the plate is referred to as a width. A short side of the first vertical extension portion 6112 and a long side of the first horizontal extension portion 6113 may be vertically connected to the first receiving portion 6111. In other words, the first receiving portion 6111 and the first horizontal extension portion 6113 may overlap in an axial direction, thereby reducing a volume of the first insulating cover portion to be described later.

A first connection portion 6115 extends in a radial direction from an end portion of the first horizontal extension portion 6113. The first connection portion 6115 extends to a length that can be inserted into a support groove 3152 disposed in the outer wall portion 315 to be described later. In addition, the first connection portion 6114 may extend in a radial direction from the middle of the first horizontal extension portion 6113. In other words, a plurality of connection portions may extend in a radial direction from the first horizontal extension portion 6113.

The second and third busbars 612, 613 are disposed similarly to the first busbar 611. However, an axial length of the second vertical extension portion 6122 is disposed to be larger than that of the first vertical extension portion 6112, and an axial length of the third vertical extension portion 6132 is disposed to be larger than that of the second vertical extension portion 6122.

In addition, a circumferential length of the second horizontal extension portion 6123 is disposed to be larger than that of the first horizontal extension portion 6113, and a circumferential length of the third horizontal extension portion 6133 is disposed to be larger than that of the second horizontal extension portion 6123.

Through this, the first, second and third vertical extension portions 6112, 6122, 6132 are disposed with a predetermined height difference in an axial direction from one another. In other words, the first horizontal extension portion 6113 and the second horizontal extension portion 6123 are axially spaced apart from each other by an axial length difference between the first vertical extension portion 6112 and the second vertical extension portion 6122, and the second horizontal extension portion 6123 and the third horizontal extension portion 6133 are axially spaced apart from each other by an axial length difference between the second vertical extension portion 6122 and the third vertical extension portion 6132, and the first, second and third vertical extension portions 6112, 6122, 6132 are disposed such that at least part thereof overlap in an axial direction.

Then, a volume of the first insulating cover portion 650 that wraps and seals the first, second, and third busbars 610 may be reduced. This will be described in detail later.

The first connection portions 6114, 6115 extend in a radial direction from the first horizontal extension portion 6113. The second connection portions 6124, 6125 extend in a radial direction from the second horizontal extension portion 6123, and extend in an axial direction by an axial height difference from the first horizontal extension portion 6113, and extend in a radial direction again therefrom. The third connection portions 6134, 6135 extend in a radial direction from the third horizontal extension portion 6133, and extend in an axial direction by an axial height difference from the first horizontal extension portion 6113, and extend in a radial direction again therefrom. In other words, the second and third connection portions are disposed to extend in a stepped shape.

Through this, the end portions 6114a, 6115a, 6124a, 6125a, 6134a, 6135a of the first, second and third connection portions extend toward the outer wall portion 315 to be described later at the same height, and may be inserted and supported by the receiving groove 3152 disposed on the outer wall portion 315, respectively.

Then, the outer wall portion 315 and the sealing cover 316 that is assembled thereto to seal the first, second and third connection portions 6114, 6115, 6124, 6125, 6134, 6135 may be more easily molded to prevent more load from being applied to any one of the first, second, and third connection portions 6114, 6115, 6124, 6125, 6134, 6135 during the operation of the compressor. This will be described in detail later.

Figure 2B:
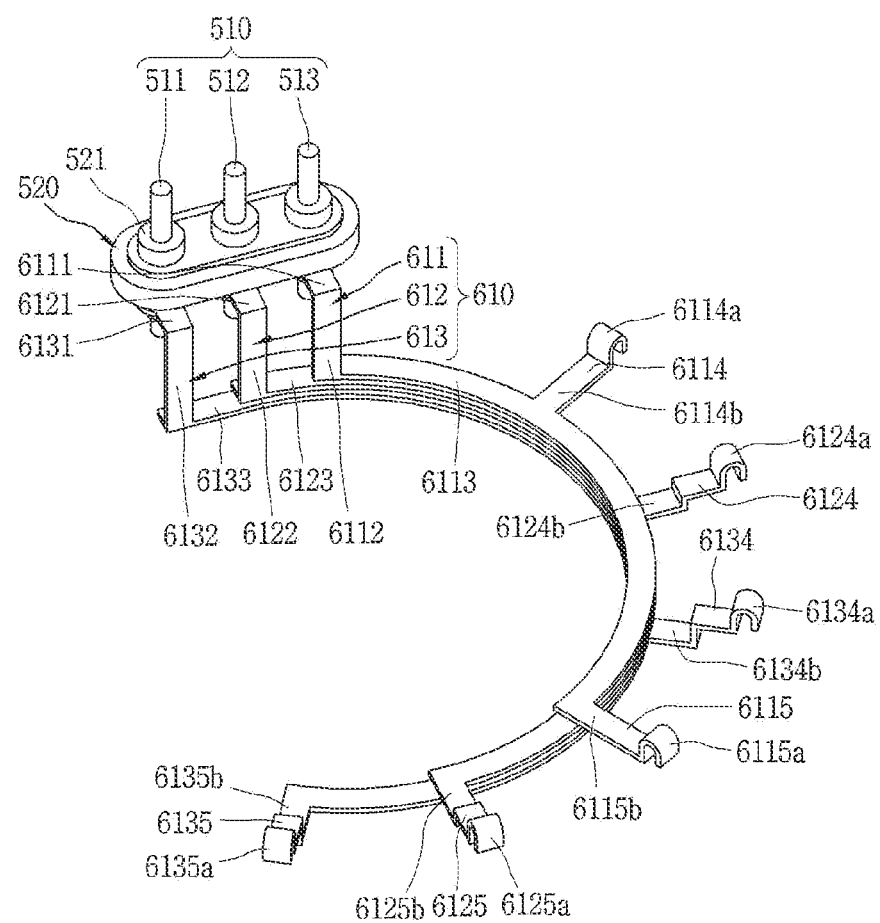
FIG. 2B is an exploded view of the three-phase hermetic terminal shown in FIG. 2A.

FIG. 2B is a perspective view in which the hermetic terminal assembly 500, the busbar 610, and the first insulating cover portion 650 are coupled in a motor operated compressor according to an embodiment of the present disclosure.

The first, second, and third conductive members 510 are enclosed by the hollow insulating members 521 and inserted at a predetermined interval at one side of the body member 520, and one end portion thereof is coupled to protrude toward the inverter unit 400, and the other end thereof toward the main housing 110. The body member 520 may be molded to wrap the hollow insulating members 521. Alternatively, the body member 520 is disposed with an insertion hole having a size substantially the same as an outer diameter of the hollow insulating member 521, and thus the hollow insulating member 521 may be press-fitted into the insertion hole.

The other end portion of the conductive member 510 protruding into the main housing 110 is connected to the receiving portions 6111, 6121, 6131 of the busbar 610. In the receiving portions 6111, 6121, 6131, a receiving hole into which the other end of the conductive member 510 is inserted is disposed, and a diameter of the receiving hole is disposed substantially the same as that of the conductive member 510. In order to prevent a resistance on a contact surface between the receiving portions 6111, 6121, 6131 and the conductive member 510 from being excessively increased, a contact surface between the receiving portions 6111, 6121, 6131 and the conductive member 510 may be disposed with a predetermined area or more.

End portions of the first, second and third conductive members 510 may be positioned on the same plane perpendicular to the axial direction. The plurality of receiving portions 6111, 6121, 6131 disposed with receiving holes are also positioned at predetermined intervals on the same plane perpendicular to the axial direction, and the first, second and third vertical extension portions 6112, 6122, 6132 extend downward from the plurality of receiving portions 6111, 6121, 6131. The first, second and third vertical extension portions 6112, 6122, 6132 may be defined in a plate shape having a narrow width and a long length, and the lengths of the first, second, and third vertical extension portions 6112, 6122, 6132 sequentially increase. In other words, an end portion of the first vertical extension portion 6112 is axially positioned in the front than that of the second vertical extension portion 6122, and an end portion of the second vertical extension portion 6122 than that of the third vertical extension portion 6132.

The first, second, and third horizontal extension portions 6113, 6123, 6133 extend from end portions of the first, second and third vertical extension portions 6112, 6122, and 6132. The first, second and third vertical extension portions 6112, 6122, 6132 are defined in a plate shape having a narrow width and a long length. A short side of the first, second, and third vertical extension portion 6112, 6122, 6132 and a long side of the first, second, and third horizontal extension portion 6113, 6123, 6133 are in contact with each other to make the vertical extension portion 6112, 6122, 6132 and horizontal extension portions 6113, 6123, 6133 to be perpendicular to each other. The horizontal extension portions 6113, 6123, 6133 overlap with the receiving portions 6111, 6121, 6131 in the axial direction.

The first, second and third vertical extension portions 6112, 6122, 6132 are spaced apart at a predetermined interval on the same plane perpendicular to the axial direction, and the third horizontal extension portion 6113 extends straight toward the first vertical extension portion 6112 by a length spaced apart from the first horizontal extension portion 6113, and the second horizontal extension portion 6123 extends straight toward the first vertical extension portion 6112 by a length spaced apart from the first horizontal extension portion 6113. Through this, the first, second, and third horizontal extension portions 6113, 6123, 6133 overlap at a predetermined interval in an axial direction from a lower side of the first vertical extension portion 6112, and is bent outward radially therefrom along a circumferential direction. For a circumferential direction of the first, second, and third vertical extension portions 6112, 6122, 6132, the first horizontal extension portion 6113 is disposed to have the shortest length, and the third horizontal extension portion 6133 is disposed to have the longest length.

The first, second and third vertical extension portions 6112, 6122, 6132 are disposed to overlap in an axial direction with a predetermined height difference, and the first connection portions 6114, 6115 extend from the first horizontal extension portion 6113 in a radial direction, and the second and third connection portions are defined in a stepped shape that rises in a front axial and radial directions, and end portions 6114a, 6115a, 6124a, 6125a, 6134a, 6135a of the first, second and third connection portions are positioned at the same height in an axial direction. The first, second and third connection portions 6114, 6115, 6124, 6125, 6134, 6135 may be defined in a plate shape having a narrow width, and the same axial thickness as that of the first, second and third vertical extension portions 6112, 6122, 6132.

The end portions 6114*a*, 6115*a*, 6124*a*, 6125*a*, 6134*a*, 6135*a* of the first, second, and third connection portions may be defined in a fork shape that is convexly curved in an axially upward direction. A lead wire 3123 of the coil is inserted and coupled between the curved surfaces facing each other.

Figure 3A:
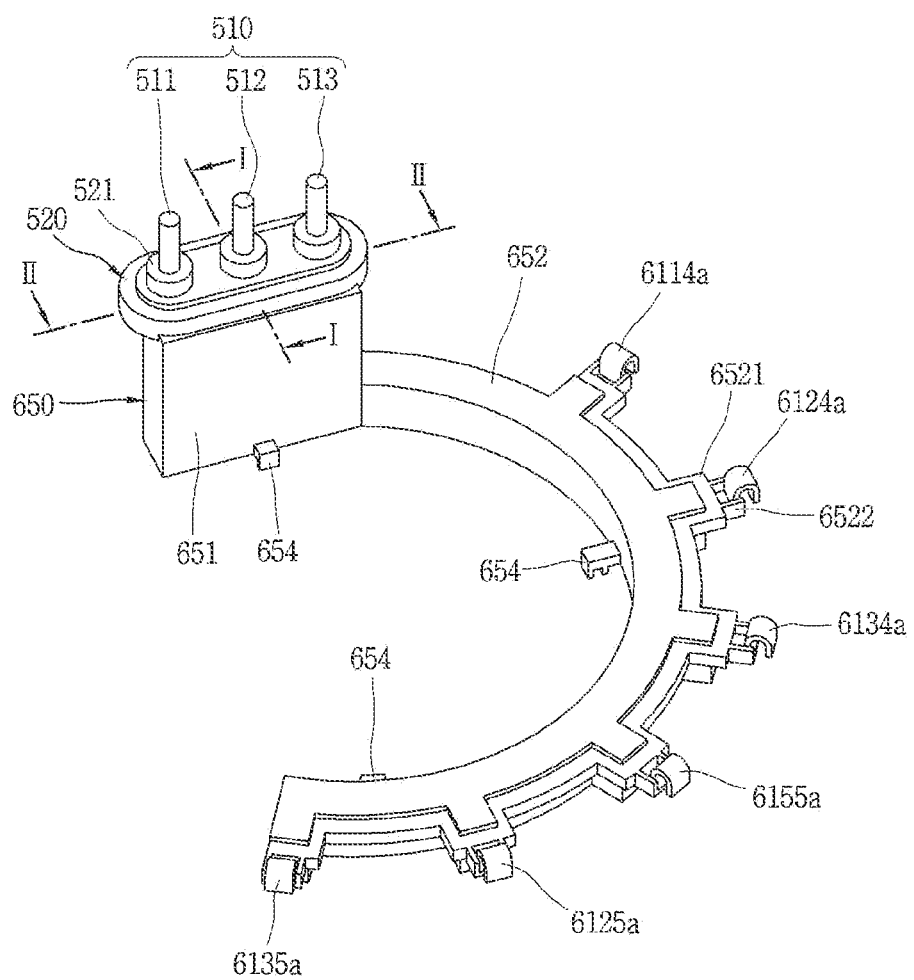
FIG. 3A is a perspective view showing a three-phase hermetic terminal of a motor operated compressor according to the present disclosure.

FIG. 3A shows a structure in which the first insulating cover portion 650 is enclosed around the hermetic terminal assembly 500 and the busbar 610 to be coupled to one another.

Referring to FIG. 3A, a lower side of the hermetic terminal assembly 500 and the busbar 610 are enclosed and sealed by the first insulating cover portion 650.

One end portion of the conductive member 510 is connected to the inverter unit 400, and the connection portions 6114, 6115, 6124, 6125, 6134, 6135 of the busbar 610 connected to the conductive member 510 are coupled to a lead wire 3123 of the coil drawn out from the motor, thereby allowing the inverter unit 400 and the motor unit 300 to be connected in an electrically conductive manner.

In other words, since both the conductive member 510 and the busbar 610 are conductive conductors, insulation breakdown may occur when they are exposed to refrigerant or oil introduced from a suction port (not shown) positioned in front of the main housing 110.

The first insulating cover portion 650 is disposed to wrap and seal a rear side of the body member 520, the other end portion of the conductive member 510 protruding toward the main housing 110 and the busbar 610 to prevent the conductive member 510 and the busbar 610 from being exposed to gas or liquid phase refrigerant or oil.

Through this, the first insulating cover portion 650 wraps and seals conductors exposed toward the main housing 110. In other words, the first insulating cover portion 650 is disposed to wrap and seal the other end portion of the conductive member 510 protruding toward the main housing 110, the receiving portions 6111, 6121, 6131, the vertical extension portions 6112, 6122, 6132, the horizontal extension portions 6113, 6123, 6133, and part of the connection portions 6114. 6115, 6124, 6125, 6134, 6135.

All the conductors positioned in the main housing 110 may be sealed to prevent the occurrence of insulation breakdown by the refrigerant or oil introduced from a front side of the main housing 110.

As a method of sealing, an injection molding method may be employed. Injection molding is a method in which plastic is heated and melted, then injected into a mold at high pressure to cool and solidify the injected plastic while maintaining the pressure.

In other words, the hermetic terminal assembly 500 and the busbar 610 coupled to each other are placed in a mold having a preset shape, and then a melted insulating material is injected into the mold and cooled and solidified to form the first insulating cover portion 650.

In addition, in an embodiment of the present disclosure, the body member 520 and the first insulating cover portion 650 may be integrally formed. The conductive members 510 connected to each other, the insulating member 521 surrounding them, and the busbar 610 connected to the conductive members 510 may be placed in a mold having a preset shape, and then a melted insulating material is injected into the mold and cooled and solidified to form the insulating cover portion. In other words, the body member 520 and the first insulating cover portion 650 may be integrally formed.

Through the above structure, the surfaces of the conductive member 510 and the busbar 610 may be completely sealed except for one end portion of the conductive member 510 exposed to the inverter unit 400 and end portions of the connection portions 6114. 6115, 6124, 6125, 6134, 6135 coupled to the lead wire 3123 of the coil at the second insulating cover portion to be described later.

However, when molding the first insulating cover portion 650, the end portions 6114*a*, 6115*a*, 6124*a*, 6125*a*, 6134*a*, 6135*a* of the connection portion coupled to the lead wire 3123 of the coil drawn out from the motor unit 300 are configured to be exposed, and one end portion of the conductive member 510 protruding to the inverter unit 400 is also exposed in the inverter unit 400.

The conductive member 510 exposed to the inverter unit 400 is blocked from gas or liquid phase refrigerant or oil through an external sealing structure using a rubber sealing member to be described later, and the end portions 6114*a*, 6115*a*, 6124*a*, 6125*a*, 6134*a*, 6135*a* of the connection portion are sealed by a second insulating cover portion to be described later.

The first insulating cover portion 650 is disposed to seal along an outer circumferential surface of the body member 520 so as to enclose the other end of the conductive member 510, and to seal the other end portion of the conductive member 510 protruding into the main housing 110 from the other side of the body member 520, the receiving portions 6111, 6121, 6131, the vertical extension portions 6112, 6122, 6132, the horizontal extension portions 6113, 6123, 6133, and part of the connection portions 6114, 6115, 6124, 6125, 6134, 6135.

The other side of the body member 520, the other end portion of the conductive member 510 protruding into the main housing 110 from the other side of the body member 520, the receiving portions 6111, 6121, 6131, the vertical extension portions 6112, 6122, 6132 and part of the horizontal extension portions 6113, 6123, 6133 are sealed by an axial insulation portion 651, and the rest of the horizontal extension portions 6113, 6123, 6133 extending along a circumferential direction is sealed by a circumferential insulating portion 652.

The first insulating cover portion 650 includes a stop portion 6251 and a terminal guide portion 6522 that enclose the connection portions 6114, 6115, 6124, 6125, 6134, 6135 and extend radially from the circumferential insulation portion 652 at a portion that encloses the connection portions 6114, 6115, 6124, 6125, 6134, 6135. The stop portion 6251 has a width wider than that of the connection portions 6114, 6115, 6124, 6125, 6134, 6135, and includes the terminal guide portion 6522 extending from the stop portion 6251 and having a width wider than that of the connection portion 6114, 6115, 6124, 6125, 6134, 6135 and narrower than the stop portion.

The width of the terminal guide portion 6522 is disposed to be the same as that of the receiving groove 3152 of the outer wall portion 315 into which the connection portions 6114, 6115, 6124, 6125, 6134, 6135 are inserted, and the width of the stop portion 6521 is disposed to be larger than that of the receiving groove 3152. Through this, when the end portions 6114*a*, 6115*a*, 6124*a*, 6125*a*, 6134*a*, 6135*a* of the connection portions and the terminal guide portion 6522 enclosing them are engaged with the receiving grooves 3152 and inserted over a predetermined length, the outer wall portion 315 is pressurized to fix the connection portions 6114, 6115, 6124, 6125, 6134, 6135.

The terminal guide portion 6522 encloses the connection portions 6114, 6115, 6124, 6125, 6134, 6135 to expose the connection portions 6114, 6115, 6124, 6125, 6134, 6135 and part of an axial upper side of the end portions 6114a, 6115a, 6124a, 6125a, 6134a, 6135a of the connection portions. The width of the terminal guide portion 6522 is disposed to be substantially the same as that of the receiving groove 3152 of the outer wall portion 315, thereby guiding the end portions 6114a, 6115a, 6124a, 6125a, 6134a, 6135a of the connection portions to be slidably inserted into the receiving grooves 3152.

The terminal guide portions 6522 inserted into the receiving grooves 3152 together with the end portions 6114a, 6115a, 6124a, 6125a, 6134a, 6135a of the connection portions support and fix the end portions 6114a, 6115a, 6124a, 6125a, 6134a, 6135a of the connection portions.

A coupling groove 654 may be disposed on a surface facing a rotation shaft of the first insulating cover portion 650. The coupling groove 654 is disposed below the inner surface and engaged with and coupled to an inner wall portion extending from an inner end portion of the stator.

The coupling groove 654 may be disposed in plural along a surface facing the rotation shaft of the first insulating cover portion 650. The coupling groove 654 is coupled to an inner wall portion extending in an axial direction from an inner surface of the stator to support the hermetic terminal assembly 500 and the busbar 610 in an axial direction.

Figure 3B:
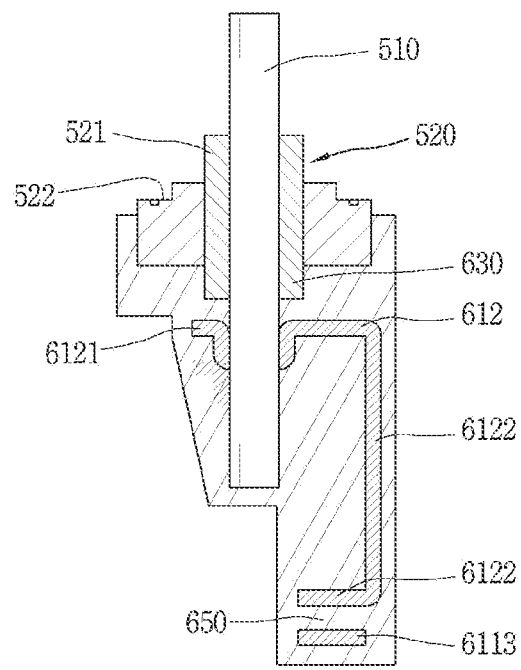
FIG. 3B is a cross-sectional view showing a cross section taken along line I-I in FIG. 3A.

FIG. 3B shows a cross section taken along line I-I in FIG. 3A.

Referring to FIG. 3B, a structure in which the conductive member 510, the busbar 610 and the body member 520 in the main housing 110 are completely sealed is shown in detail.

One end portion of the conductive member 510 protrudes toward the inverter unit 400, and the other end thereof is sealed by the first insulating cover portion 650 enclosing it.

In addition, the receiving portions 6111, 6121, 6131 of the busbar 610 coupled to the other end of the conductive member 510, the vertical extension portions 6112, 6122, 6132 extending from the receiving portions 6111, 6121, 6131, the horizontal extension portions 6113, 6123, 6133 extending from the vertical extension portions 6112, 6122, 6132 are enclosed and sealed by the first insulating cover portion 650.

As described above, at least part of the plurality of busbars 610 are arranged to overlap in an axial direction.

In order to reduce a volume of the first insulating cover portion 650, the receiving portions 6111, 6121, 6131 and the horizontal extension portions 6113, 6123, 6133 are disposed to overlap in an axial direction, and the second horizontal extension portion 6123 and the third horizontal extension portion 6133 are disposed to axially overlap in a downward direction of the second vertical extension portion 6122.

In addition, although not shown in FIG. 3B, the first, second, and third vertical extension portions 6112, 6122, 6132 are disposed to axially overlap in a downward direction of the first vertical extension portion 6112, and extend in a circumferential direction while overlapping in an axial direction.

An annular second step portion 522 recessed inward by a predetermined length from an outer circumference of the body member 520 of the hermetic terminal assembly 500 toward the inverter unit 400 may be disposed, and annular second sealing members 901, 902 may be inserted into the annular second step portion 522. This will be described in detail later.

Figure 3C:
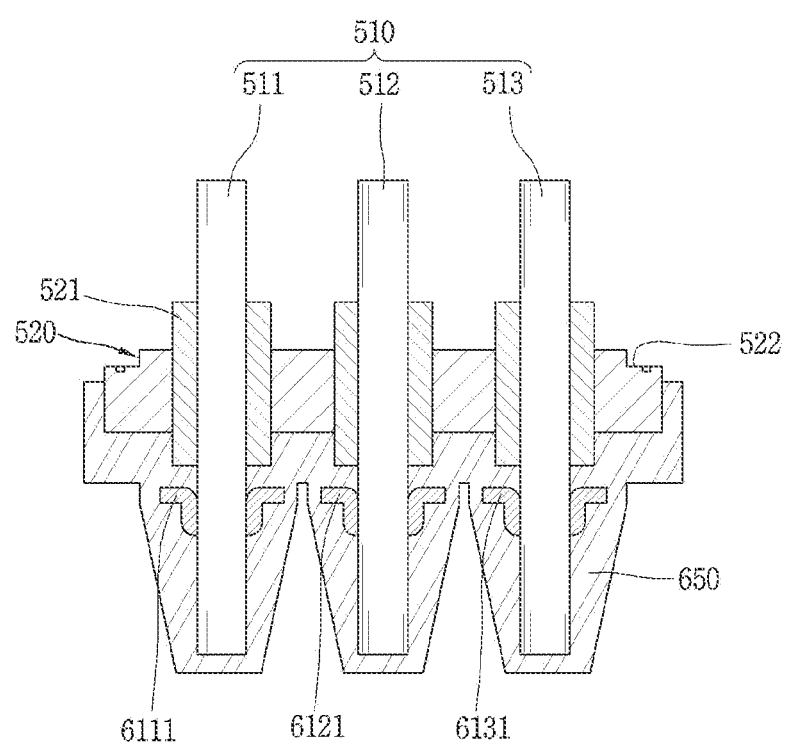
FIG. 3C is a cross-sectional view showing a cross section taken along line II-II in FIG. 3A.

FIG. 3C shows a cross section taken along line II-II in FIG. 3A.

Referring to FIG. 3C, a structure in which the conductive member 510 and the receiving portions 6111, 6121, 6131 of the busbar 610 are completely sealed is shown in detail.

One end portion of the first, second, and third conductive members 510 protrudes toward the inverter unit 400, and the other end thereof is sealed by the first insulating cover portion 650 enclosing it.

In addition, the receiving portions 6111, 6121, 6131 of the busbar 610 coupled with the other ends of the first, second and third conductive members 510 are enclosed and sealed by the first insulating cover portion 650.

In other words, the first insulating cover portion 650 encloses and seals the hermetic terminal assembly 500 and the plurality of busbars 610. The first insulating cover portion 650 encloses the body member 520 along an outer circumferential surface thereof to seal the other side of the body member 520, and disposed to enclose along a circumference of the other ends of the first, second and third conductive members 510 protruding from the other side of the body member 520, and the receiving portions 6111, 6121, 6131 of the busbar 610 coupled to the other ends.

Since the II-II line is a line connecting the first, second and third conductive members 510, and only the first, second and third receiving portions of the first, second, and third busbars 610 are shown in FIG. 3C.

An annular second step portion 522 recessed to a predetermined depth along an outer circumference of the body member 520 of the hermetic terminal assembly 500 toward the inverter unit 400 may be disposed, and the annular second sealing member 901 may be inserted into the annular second step portion 522. This will be described in detail later.

Figure 4A:
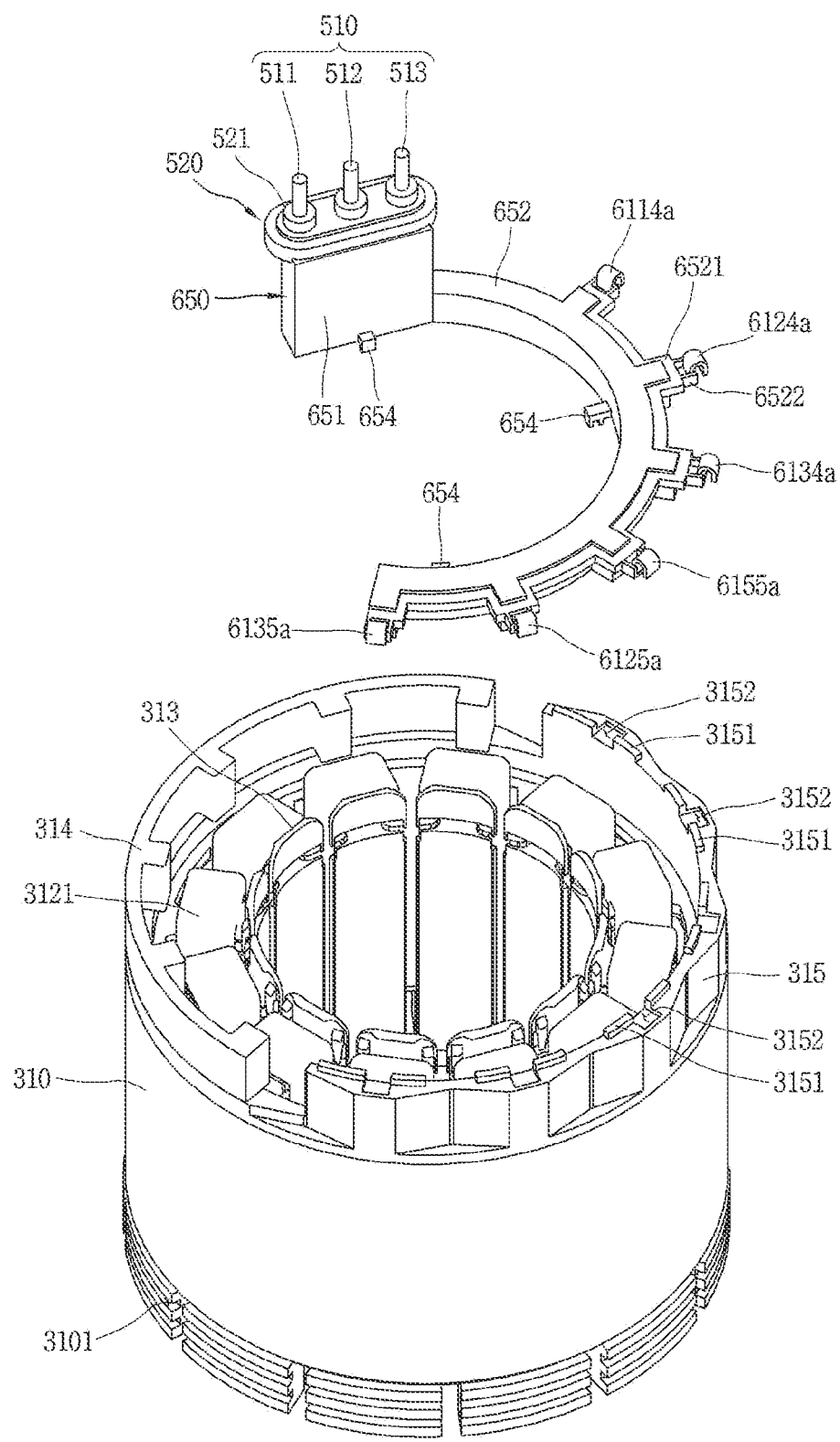
FIG. 4A is a perspective view showing a hermetic terminal and a motor unit according to the present disclosure.

FIG. 4A is a perspective view showing an exploded view of the hermetic terminal assembly 500 according to the present disclosure before the motor unit 300 is coupled thereto.

Referring to FIG. 4A, the hermetic terminal assembly 500, the busbar 610, and the first insulating cover portion 650 coupled to one another shown in FIG. 3A are shown, and the motor unit 300 coupled thereto is shown.

The motor unit 300 includes a stator 310, and an inner wall portion 313 is disposed to extend in an axial direction and an outer wall portion 315 is disposed to the outside thereof to the inside with the end coil 3121 on the front side of the stator 310 interposed therebetween.

The outer wall portion 315 includes a first outer wall portion 315 disposed with the receiving groove 3152 into which the connection portions 6114, 6115, 6124, 6125, 6134, 6135 of the busbar 610 are inserted and a second outer wall portion that is not disposed with the receiving groove 3152.

At a front side of the first outer wall portion 315, the receiving groove 3152 is disposed to accommodate the end portions 6114a, 6115a, 6124a, 6125a, 6134a, 6135a of the connection portion and a terminal guide portion 6522 enclosing the connection portion to support them in an axial direction. Furthermore, a width of the receiving groove 3152 is disposed almost the same as that of the terminal guide portion 6522 to support and fix the terminal guide portion 6522 and the end portions 6114a, 6115a, 6124a, 6125a, 6134a, 6135a of the connection portion.

The length in a direction in which the connection portions 6114, 6115, 6124, 6125, 6134, 6135 of the terminal guide portion 6522 extend is disposed such that all of the terminal guide portions 6252 can be accommodated in the receiving groove 3152.

In addition, the coupling protrusion portion 3151 may be disposed to extend in an axial direction at a front side of the first outer wall portion 315. The coupling protrusion portion 3151 is disposed to engage with the sealing cover 316 to be described later.

The coupling groove 654 is disposed at a rear side on a surface of the first insulating cover portion 650 facing the rotation shaft, and the coupling groove 654 is supported in an axial direction by engaging with the inner wall portion 313, and the end portions 6114a, 6115a, 6124a, 6125a, 6134a, 6135a of the connection portion and the terminal guide portions 6522 enclosing them are engaged with the receiving grooves 3152 and supported in an axial direction.

Furthermore, a connection groove 3101 disposed at a predetermined interval in an axial direction along an outer circumferential surface is disposed at a rear side of the stator 310. A coil drawn out from one end coil 3121 at a rear side of the stator 310 may be connected to the other end coil 3121 through the connection groove 3101.

In addition, although not shown, a coil drawn out from one end coil 3121 at a front side of the stator 310 may be connected to the other end coil 3121 through an inside of the second outer wall portion 314.

Figure 4B:
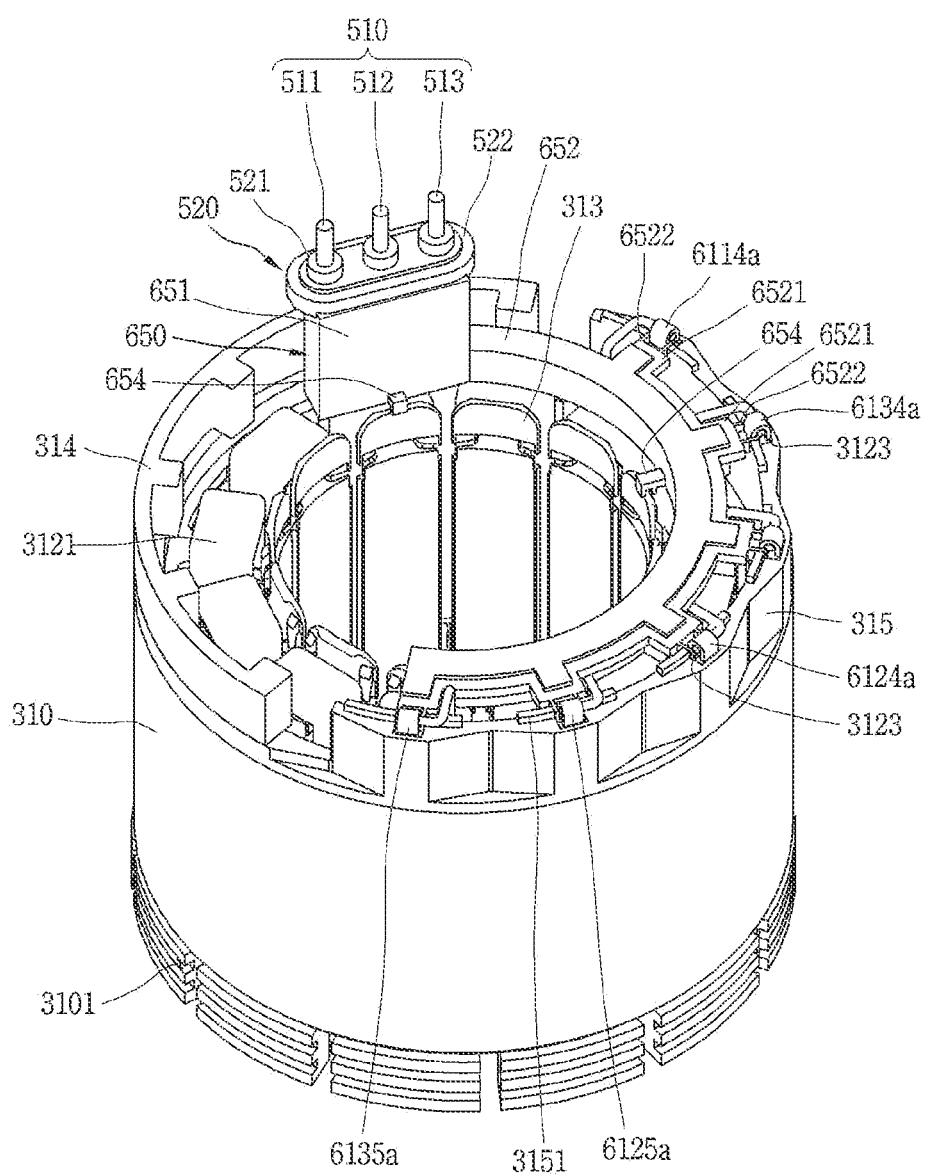
FIG. 4B is a perspective view showing a motor unit coupled to a hermetic terminal according to the present disclosure.

FIG. 4B is a perspective view showing a state in which the hermetic terminal assembly 500 and the motor unit 300 are coupled according to the present disclosure.

Referring to FIG. 4B, the end portions 6114a, 6115a, 6124a, 6125a, 6134a, 6135a of the connection portion of the busbar 610 and the terminal guide portions 6522 are inserted into the receiving grooves 3152 disposed in the first outer wall portion 315, and the coupling groove 654 and the inner wall portion 313 disposed in the first insulating cover portion 650 are coupled to each other. Through this, the hermetic terminal assembly 500 and the busbar 610 are supported and fixed to the motor unit 300.

The length in a direction in which the connection portions 6114, 6115, 6124, 6125, 6134, 6135 of the terminal guide portion 6522 extend is disposed so as to be all accommodated in the receiving grooves 3152, and the connection portions are inserted into the receiving grooves 3152 and then pressurized by the stop portions 6251 until they are stopped.

The end portions 6114a, 6115a, 6124a, 6125a, 6134a, 6135a of the connection portions are defined in a fork shape that is convexly curved toward the inverter unit 400, and a three-phase coil drawn out from the front end coil 3121 is coupled between the connection end portions 6114a, 6115a, 6124a, 6125a, 6134a, 6135a and surfaces facing them.

The three-phase coil is enclosed by an insulating coating, and only portions coupled to the end portions 6114a, 6115a, 6124a, 6125a, 6134a, 6135a of the connection portions are removed and coupled to each other in an electrically conductive manner. In an embodiment of the present disclosure, the coil 3123 with coating removed and the end portions 6114a, 6115a, 6124a, 6125a, 6134a, 6135a of the connection portions may be coupled by pressurizing the coil 3123 with surfaces facing the end portions 6114a, 6115a, 6124a, 6125a, 6134a, 6135a of the connection portions, and the connection end portions 6114a, 6115a, 6124a, 6125a, 6134a, 6135a of the connection portions and the coil may be engaged and soldered to be coupled to each other.

The connection portions 6114, 6115, 6124, 6125, 6134, 6135 of the busbar 610 may be coated with an insulating coating agent. When the connection portions 6114, 6115, 6124, 6125, 6134, and 6135 are coated with an insulating coating agent, coating on a surface in contact with the conductor wire 3123 of the coil may be removed to be connected to each other in an electrically conductive manner.

In addition, the conductor wire of the coil and the end portions 6114a, 6115a, 6124a, 6125a, 6134a, 6135a of the connecting portions are coupled, and then a protective coating may be formed on a contact surface to prevent exposure to refrigerant or oil. In an embodiment of the present disclosure, the protective coating may be an epoxy coating.

Next, the second insulating cover portions 315, 316 according to an embodiment of the present disclosure will be described.

Figure 5:
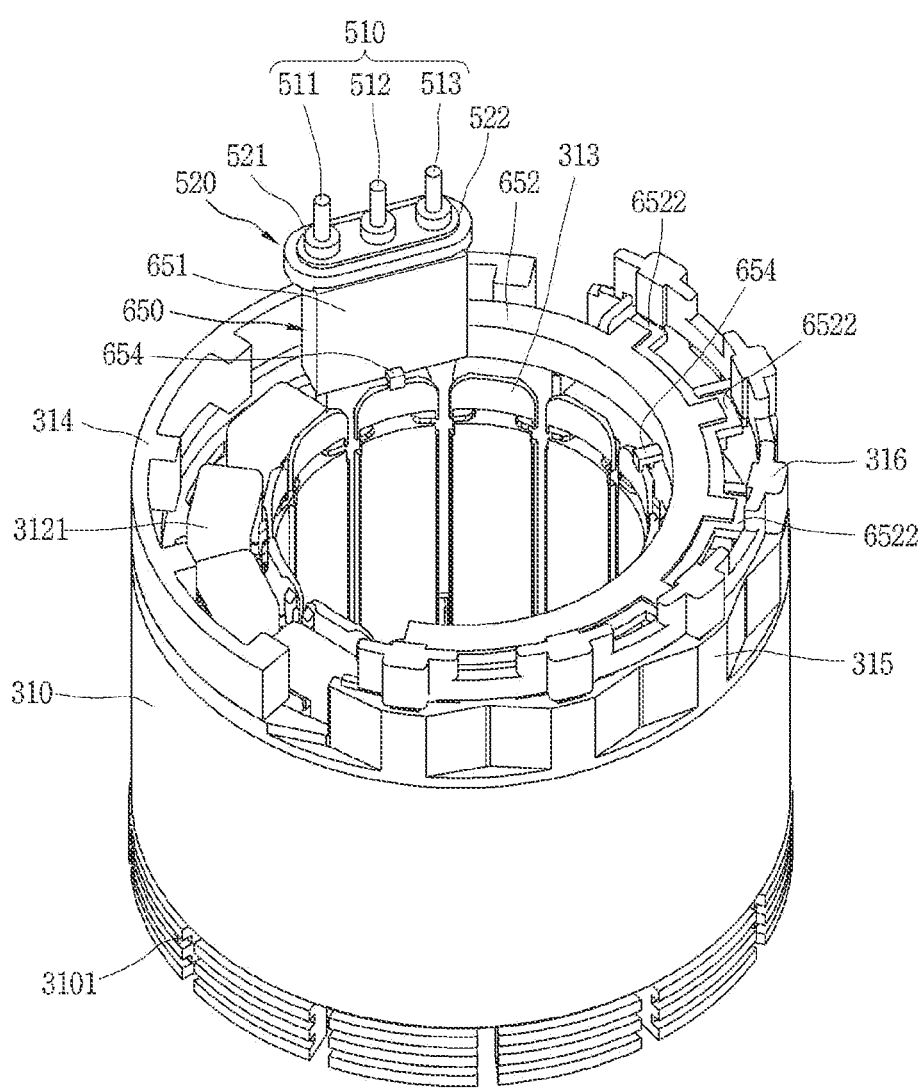
FIG. 5 is a perspective view showing a motor unit in which a sealing cover is coupled to the motor unit in FIG. 4B.

FIG. 5 is a perspective view illustrating the motor unit 300 to which the sealing cover 316 is coupled to the motor unit 300 in FIG. 4B.

Referring to FIG. 5, the ends portions 6114a, 6115a, 6124a, 6125a, 6134a, 6135a of the connection portions are enclosed and sealed by the second insulating cover portions 315, 316.

The second insulating cover portions 315, 316 includes the outer wall portion 315 disposed with the receiving grooves 3152 protruding from the outer circumference of one side of the motor unit 300 in a direction of the inverter unit 400 to accommodate the end portions 6114a, 6115a, 6124a, 6125a, 6134a, 6135a of the connection portions and the sealing cover 316 coupled to the outer wall portion 315.

End portions 6114a, 6115a, 6124a, 6125a, 6134a, 6135a of the connection portions and the terminal guide portions 6522 are inserted and accommodated in the receiving grooves 3152, and the sealing cover 316 is provided with coupling protrusions 3151 provided with a space capable of accommodating the end portions 6114a, 6115a, 6124a, 6125a, 6134a, 6135a of the connection portions in an axial direction, and the outer wall portion 315 is provided with coupling protrusion portions 3151 protruding in an axial direction, and the sealing cover 316 is provided with coupling concave portions recessed in an axial direction to be coupled to each other.

Through this, the end portions 6114a, 6115a, 6124a, 6125a, 6134a, 6135a of the connection portions are enclosed and sealed by the first insulating cover portion 650, the sealing cover 316 and the outer wall portion 315.

The end portions 6114a, 6115a, 6124a, 6125a, 6134a, and 6135a of the connection portions are enclosed by the terminal guide portions 6252, and front sides thereof are exposed. However, the terminal guide portions 6522 are inserted into the receiving grooves 3152 until they are stopped by the stop portions 6251, and all accommodated in the receiving grooves 3152, and the ends of the connection portions 6114a, 6115a, 6124a, 6125a, and all exposed portions of the connection end portions 6114a, 6115a, 6124a, 6125a, 6134a, 6135a are accommodated in the receiving grooves 3152. Here, the receiving grooves 3152 are sealed by the sealing cover 316, and the sealing cover 316 is disposed to protrude radially inward to cover at least part of a front side surface of the stop portions 6251, thereby completely sealing the connection portions 6114, 6115, 6124, 6125, 6134, 6135 not to be exposed inside the main housing.

A protective coating that prevents the inflow of refrigerant or oil may be formed along a boundary line where the sealing cover 316, the outer wall portion 315, and the stop portion 6251 are in contact with each other. In an embodiment of the present disclosure, the protective coating may be an epoxy coating.

Next, a sealing structure between the main housing 110 and the inverter unit 400 according to an embodiment of the present disclosure will be described.

Figure 6:
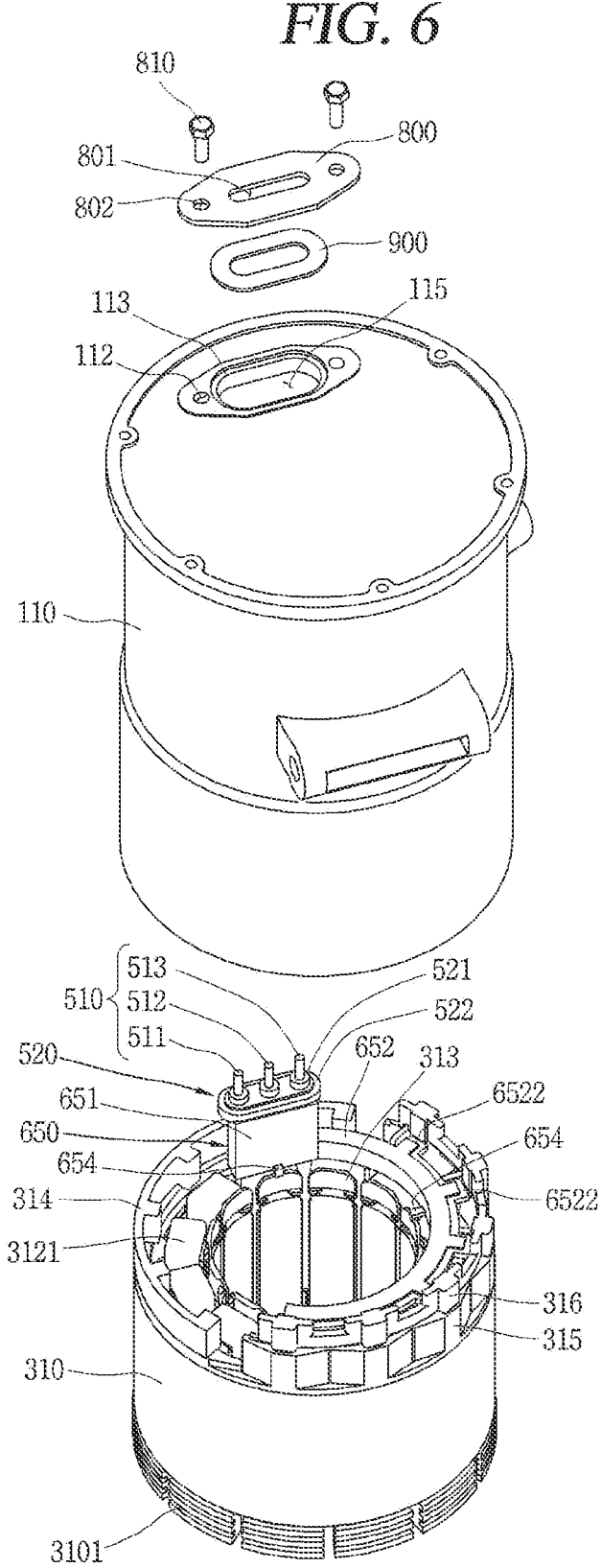
FIG. 6 is an exploded view showing a disassembled plate-housing-motor unit according to the present disclosure.

FIG. 6 is an exploded view showing a disassembled plate 800-main housing 110-motor unit 300 according to the present disclosure.

Referring to FIG. 6, it is shown the motor unit 300 shown in FIG. 5, and shown a structure that seals refrigerant or oil from flowing into the inverter unit 400 from the main housing 110 when the hermetic terminal assembly protrudes to the inverter unit 400 through a through hole 115 disposed at a front side of the main housing 110.

A plate 800 covers the through hole 115 disposed on a front layer of the main housing 110 to accommodate the conductive member 510 and the hollow insulating member 521 of the hermetic terminal assembly. A plate hole 801 for accommodating the conductive member 510 and the hollow insulating member 521 is disposed in the plate 800. The plate hole 801 may be a plurality of holes having a diameter substantially the same as that of the hollow insulating member 521 so as to accommodate the plurality of hollow insulating members 521, respectively. Alternatively, the plate hole 801 may be a single hole capable of accommodating all of the plurality of hollow insulating members 521.

A first step portion 113 recessed to a predetermined depth along an inner circumferential surface of the through hole 115, and a plurality of first bolt holes 112 spaced apart by a predetermined distance from the first step portion 113 are disposed at a front side of the main housing 110.

A plurality of second bolt holes 802 are disposed in the plate 800 at positions spaced apart by a predetermined distance from the plate holes 801 to correspond to the first bolt holes 112.

The plurality of bolts 810 are screw-coupled to the first bolt holes 112 through the second bolt holes 802, and the plate 800 is positioned between heads of the bolts 810 and a front side of the main housing 110 and pressurized toward the main housing 110 by the heads of the bolts 810.

A front side of the main housing 110 is disposed with an annular first step portion 113 recessed to a predetermined depth along an outer circumference of the through hole 115, and an annular second step portion 522 recessed to a predetermined depth is disposed along an outer circumference of a front side of the body member 520

A first annular sealing member 900 is positioned between the annular first step portion 113, the annular second step portion 522 and the plate 800, and an outer circumferential side on a rear side surface of the first annular sealing member 900 is supported by the first step portion 113, an inner circumferential side on a rear side surface thereof is supported by the second step portion 522, and a front side surface in an opposite direction to the rear side surface is supported by the plate 800.

An outer circumference of the first annular sealing portion is disposed substantially the same as that of the first step portion 113, and an inner circumference of the first annular sealing portion is disposed substantially the same as that of the second step portion 522.

In addition, a thickness of the first annular sealing portion is disposed substantially the same as a depth at which the first step portion 113 and the second step portion 522 are recessed.

In other words, when the plate 800 is coupled to a front side of the main housing and the first annular sealing member 900 is positioned between the plate 800 and the first and second step portions 113, 522, an outer circumference of the first step portion 113 includes an outer circumference of the first annular sealing member 900, and an inner circumference of the first annular sealing member 900 includes an inner circumference of the second step portion 522, and an inner circumference of the first annular sealing member 900 includes an inner circumference of the plate hole 801.

Through the above structure, gas or liquid phase refrigerant or oil in the main housing 110 is blocked from flowing into the inverter unit 400.

In other words, the conductive member 510 protruding toward the inverter unit 400 is blocked from gas or liquid phase refrigerant or oil by sealing a front side of the main housing 110, and the connection portions 6114, 6115, 6124, 6125, 6134, 6135 are blocked from gas or liquid phase refrigerant or oil by sealing the connection portions 6114, 6115, 6124, 6125, 6134, 6135 in the second insulating cover portions 315, 316.

Through the above structure, the hermetic terminal assembly in the main housing 110 and the busbar 610 connecting the hermetic terminal assembly and the motor unit 300 are sealed by the first insulating cover portion 650, and the end portions 6114a, 6115a, 6124a, 6125a, 6134a, 6135a of the connection portions and the coupling portion of the lead wire 3123 of the coil drawn out from the motor unit 300 are sealed in the second insulating cover portions 315, 316 to seal and block all metal portions positioned inside the main housing 110 from refrigerant or oil.

Furthermore, the first annular sealing member 900 is inserted into a space formed by a rear side surface of the plate 800 and the first and second step portions 113, 522 to seal the main housing 110, thereby blocking refrigerant or oil in the main housing 110 from flowing into the inverter unit 400.

In other words, the metal portion inside the main housing 110 and the main housing 110 may be sealed to satisfy a high insulation resistance condition.

Figure 7:
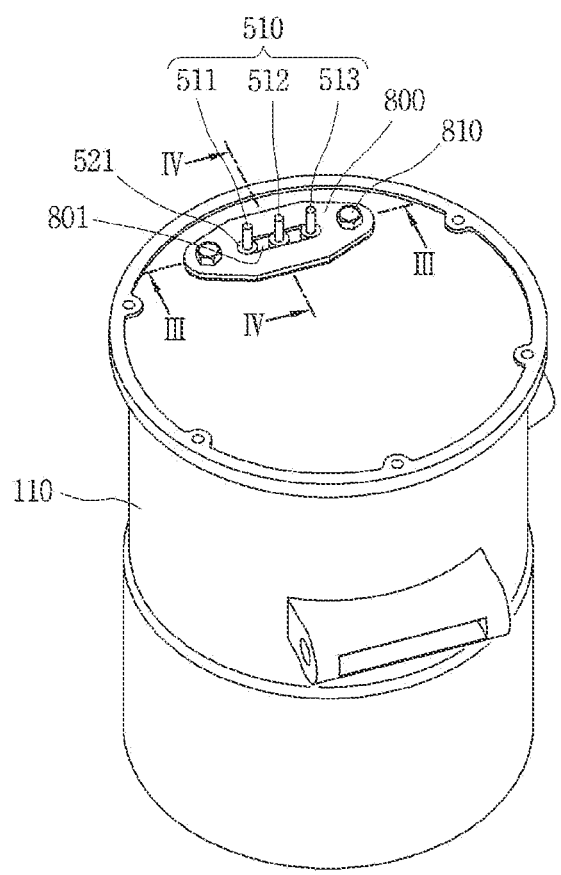
FIG. 7 is a combined view showing an assembled plate-housing-motor unit according to the present disclosure.

FIG. 7 shows a shape in which the plate 800-main housing 110-motor unit 300 shown in FIG. 6 are coupled.

Referring to FIG. 7, the plate 800 is coupled to the main housing 110 by a plurality of bolts 810 spaced apart from the plate hole 801 by a predetermined distance, and a plurality of hollow insulation members 521 are accommodated into the plate hole 801, and a plurality of conductive members 510 protrude from the plurality of hollow insulating members 521.

Both ends the conductive member 510 according to the present embodiment are connected to the inverter unit 430 in an electrically conductive manner to transfer power and control signals from the inverter unit 400 to the motor unit 300. Accordingly, the conductive member 510 is preferably formed of a material having a high electrical conductivity. For example, the conductive member 512 is formed of copper (Cu), copper, phosphor bronze, or the like, or plated with iron (Fe), iron-nickel (Fe—Ni), tin, or the like to reinforce rigidity.

The conductive member 510 is connected in an electrically conductive manner to a printed circuit device in the inverter unit 400.

Hereinafter, a sealing structure at a front side of the main housing will be described in detail with reference to a cross-sectional view taken along line III-III.

Figure 8A:
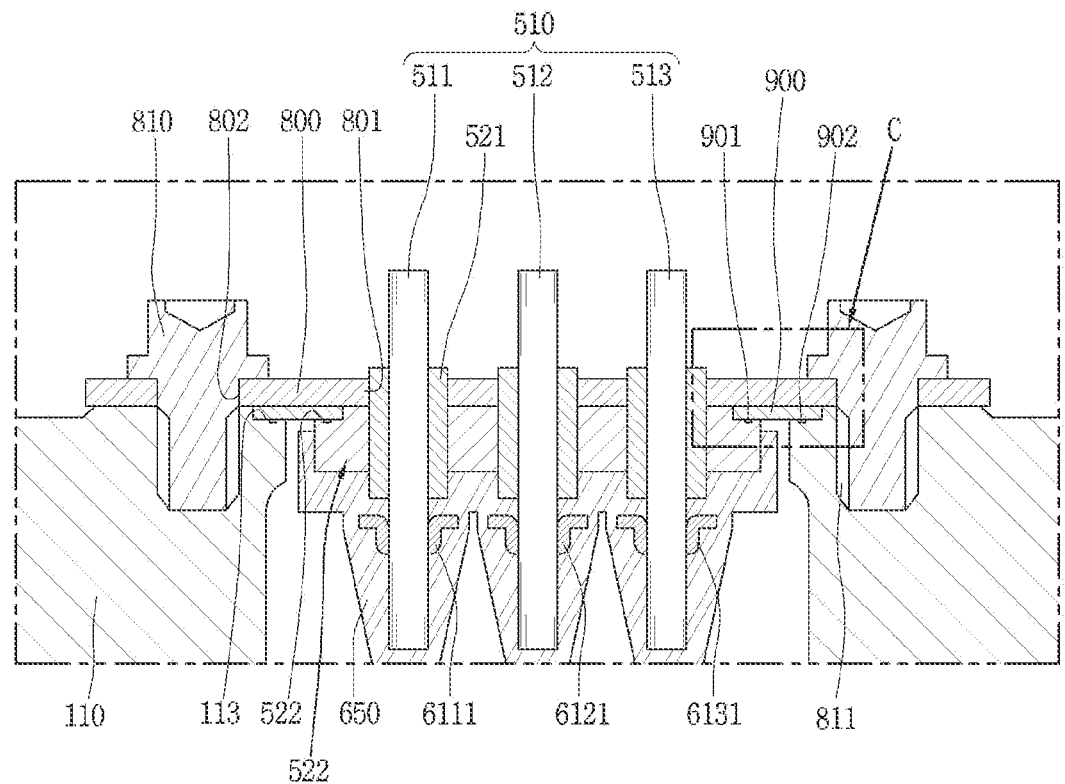
FIG. 8A is a cross-sectional view showing a cross section taken along line III-III in FIG. 7.

FIG. 8A is a cross-sectional view showing a cross section taken along line III-III in FIG. 7.

Referring to FIG. 8A, it is shown a cross section of the plate 800, the first annular sealing member 900, the hermetic terminal assembly 500, and the first insulating cover portion 650 taken along a direction in which the conductive members 510 are arranged.

The hermetic terminal assembly 500 includes a plurality of conductive members 510, a hollow insulating member 521 enclosing the plurality of conductive members 510, and a body member 520 enclosing the hollow insulating member 521, and one side of the plurality of conductive members 510 and the hollow insulating member 521 protrudes into the inverter unit 400, and the other side thereof protrudes into the main housing. The other side of the plurality of conductive members 510 protruding into the main housing 110 is connected to a plurality of busbars 610.

The plate 800 covers the through hole 115 disposed at a front side of the main housing 110, and a rear side of the plate 800 with respect to the plate 800 denotes an inside of the main housing 110, and a front side of the plate 800 denotes an outside of the main housing 110.

Then, one side of the annular plate 800 and the conductive member 510 protrudes to an outside of the main housing 110, and the body member 520, the other side of the annular plate 800, and the other side of the conductive member 510 protrude into an inside of the main housing 110.

The first insulating cover portion 650 encloses and seals the hermetic terminal assembly 500 protruding into the main housing 110 and the plurality of busbars 610.

In other words, the first insulating cover portion 650 encloses the body member 520 along an outer circumferential surface thereof to seal the other side of the body member 520, and encloses and seals the hollow insulating member 521 protruding from the other side of the body member 520 521, the conductive member 510 and the busbar 610 connected to the conductive member 510.

As described above, in an embodiment of the present disclosure, the hermetic terminal assembly 500 and the plurality of busbars 610 connected thereto may be placed into a mold having a predetermined shape, and a molten insulating material is injected into the mold, thereby enclosing and sealing the hermetic terminal assembly 500 protruding into the main housing 110 and the plurality of busbars 610.

The plate 800 covering the through hole 115 is pressurized by a bolt 810, and the plate 800 pressurizes a front side of the main housing 110. The plate hole 801 accommodates the insulating member 521 protruding from a front side surface of the body member 520, and the front side surface of the body member 520 is pressurized by the plate 800.

In other words, the through hole 115 of the main housing 110 is covered by the plate 800, and the plate hole 801 is covered by a front side surface of the body member 520, thereby sealing a front side of the main housing 110.

A sealing member may be disposed between the plate 800, the body member 520, and the main housing 110 in order to prevent leakage of refrigerant that may be caused by a pressure of refrigerant inside the main housing 110 and compressor operation vibration.

A front side of the main housing 110 is disposed with an annular first step portion 113 recessed to a predetermined depth along an outer circumference of the through hole 115, and an annular second step portion 522 recessed to a predetermined depth is disposed along an outer circumference of a front side of the body member 520 Here, a depth of the first and second step portions 522 may be disposed to have substantially the same depth.

The first annular sealing member 900 is disposed at the first and second step portions 113, 522. An outer circumferential side on a rear side surface of the first annular sealing member 900 is supported by the first step portion 113, an inner circumferential side on the rear side surface is supported by the second step portion 522, and a front side surface of the first annular sealing member 900 is supported by the plate 800.

In one embodiment according to the present disclosure, an axial thickness of the first annular sealing member 900 may be disposed to be thicker than a depth of the first and second step portions 113, 522.

Through the above structure, it may be possible to prevent refrigerant inside the main housing 110 from leaking between the plate 800 and the main housing 110, between the plate 800 and the body member 520, and block the movement of fluid between an inside of the main housing 110 and an inside of the inverter unit 400, thereby improving sealing force.

Secondary sealing portions may be disposed on surfaces where the first and second step portions 113, 522 and a rear side surface of the first annular sealing member 900 comes into contact with each other, respectively.

Annular sealing grooves 114, 523 may be disposed in the first and second annular step portions 113, 522, respectively, and second annular sealing members 901, 902 may be inserted into the annular sealing grooves 114, 523, respectively.

The second annular sealing member 902 inserted into the first step portion 113 blocks refrigerant that pressurizes a rear side of the first annular sealing member 900 from flowing in a radially outward direction, and the second annular sealing member 901 inserted into the second step portion 522 blocks refrigerant that pressurizes a rear side of the first annular sealing member 900 from flowing in a radially inward direction A double sealing structure may be employed, thereby further improving sealing force inside the main housing 110. This will be described in more detail later.

Figure 8B:
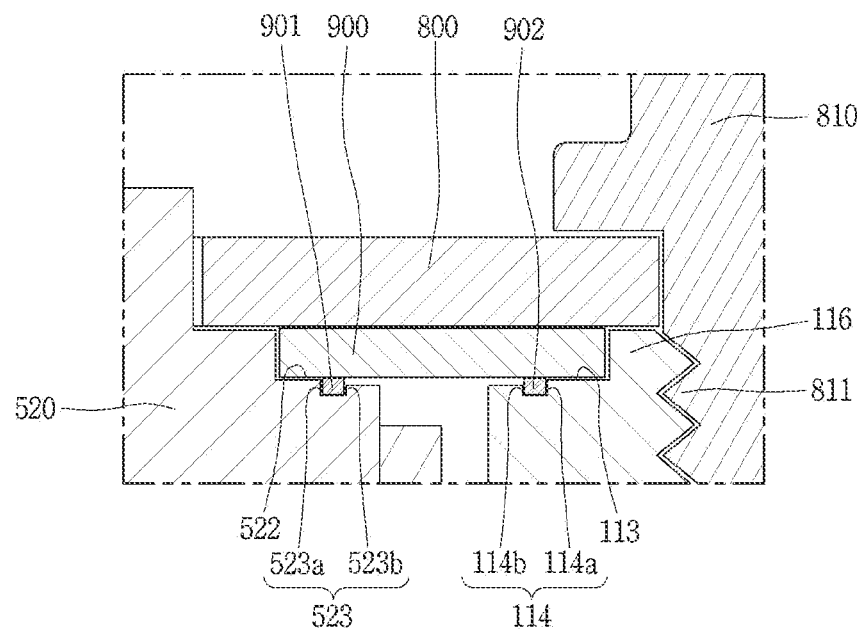
FIG. 8B is an enlarged view showing a portion C in FIG. 8A.

FIG. 8B is an enlarged view showing a portion C in FIG. 8A.

Referring to FIG. 8B, a double sealing structure disposed between the plate 800, the body member 520 and the main housing 110 is shown in detail.

The first annular sealing member 900 is inserted into a space between a rear surface of the plate 800, the first annular step 113 and the second annular step 522.

Here, secondary sealing portions may be disposed on surfaces where the first and second step portions 113, 522 and a rear side surface of the first annular sealing member 900 are in contact with each other, respectively. A double sealing structure may be employed, thereby further improving sealing force inside the main housing 110.

A height of an inner side surface 114b between both surfaces facing the annular sealing groove 114 disposed on a surface where the first step portion 113 and a rear side surface of the first annular sealing member 900 are in contact with each other is lower than the outer side surface 114a, and a height of an outer side surface 523b between both surfaces facing the annular sealing groove 523 disposed on a surface where the second step portion 522 and a rear side surface of the first annular sealing member 900 are in contact with each other is lower than the inner side surface 523a.

Through this, when refrigerant flows in a radially outward direction from a surface where the first step portion 113 and a rear side surface of the first annular sealing member 900 are in contact with each other, the second annular sealing member 902 is pressurized in a radially outward direction, and when refrigerant flows in a radially inward direction from a surface where the second step portion 522 and a rear side surface of the first annular sealing member 900 are in contact with each other, the second annular sealing member 902 is pressurized in a radially inward direction, thereby improving a sealing force of the second annular sealing members 901, 902.

In addition, a separation prevention wall 116 may be disposed between the first step portion 113 and the bolt 810 inserted into the first bolt hole 112. When the first annular sealing member 900 directly comes into contact with an outer circumferential surface of the bolt 810 without the separation prevention wall 116, the first annular sealing member 900 may engage with a thread 811 of the bolt 810, thereby causing a problem in which the first bolt hole 112 as the bolt 810 is fastened to the first bolt hole 112, thereby causing a problem of being dragged into the bolt hole 112. In addition, there may occur a problem in that the first annular sealing member 900 is deformed by being separated from the first bolt hole 112 due to a pressure of refrigerant inside the main housing 110.

By placing the separation prevention wall 116 between the first step portion 113 and the first bolt hole 112, the damage, deformation, and separation of the first annular sealing member 900 may be prevented.

Figure 9:
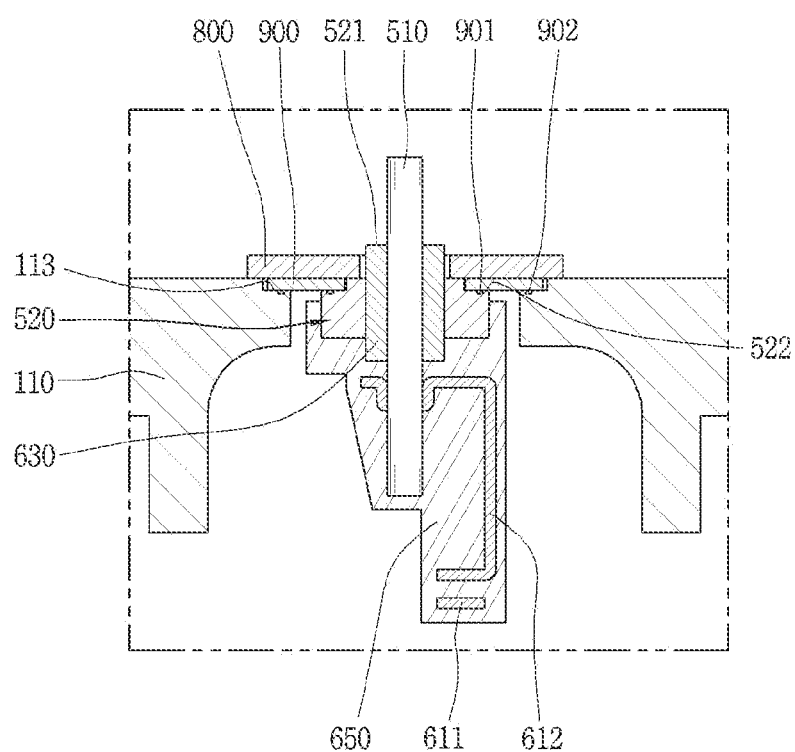
FIG. 9 is a cross-sectional view showing a cross section taken along line IV-IV in FIG. 7.

FIG. 9 is a cross-sectional view showing a cross section taken along line IV-IV in FIG. 7.

Referring to FIG. 8A, it is shown a cross section of the plate 800, the first annular sealing member 900, the hermetic terminal assembly 500, and the first insulating cover portion 650 taken along a direction perpendicular to a direction in which the conductive members 510 are arranged.

A sealing structure of the main housing 110 between the plate 800, the first annular sealing member 900 and the body member 520 shown in FIG. 9 is the same as the structure described in FIGS. 8 and 9, and the description thereof will be replaced with the description of FIGS. 8 and 9.

The hermetic terminal assembly 500 includes a plurality of conductive members 510, a hollow insulating member 521 enclosing the plurality of conductive members 510, and a body member 520 enclosing the hollow insulating member 521, and one side of the plurality of conductive members 510 and the hollow insulating member 521 protrudes into the inverter unit 400, and the other side thereof protrudes into the main housing 110. The other side of the plurality of conductive members 510 protruding into the main housing 110 is connected to a plurality of receiving portions 6111, 6121, 6131, and vertical extension portions 6112, 6122, 6132 extend in an axial direction from the plurality of receiving portions 6111, 6121, 6131, and horizontal extension portions 6113, 6123 extend in a circumferential direction from the vertical extension portions 6112, 6122, 6132, 6133. The plate 800 covers the through hole 115 disposed at a front side of the main frame, and a rear side of the plate 800 with respect to the plate 800 denotes an inside of the main housing 110, and a front side of the plate 800 denotes an outside of the main housing 110.

Then, one side of the annular plate 800 and the conductive member 510 protrudes to an outside of the main housing 110, and the body member 520, the other side of the annular plate 800, and the other side of the conductive member 510 protrude into an inside of the main housing 110.

The first insulating cover portion 650 encloses and seals the hermetic terminal assembly 500 protruding into the main housing 110, the plurality of receiving portions 6111, 6121, 6131, the vertical extension portions 6112, 6122, 6132, and the horizontal extension portions 6113, 6123, 6133.

In other words, the first insulating cover portion 650 encloses the body member 520 along an outer circumferential surface thereof to seal the other side of the body member 520, and encloses and seals the hollow insulating member 521 protruding from the other side of the body member 520 521, the conductive member 510 and the busbar 6113, 6123, 6133 connected to the conductive member 510.

Through the above structure, the metal portion inside the main housing 110 may be sealed, and the main housing 110 may be sealed, thereby satisfying a high insulation resistance condition.

Though the present invention is described with reference to preferred embodiments, various modifications and improvements will become apparent to those skilled in the art without departing from the concept and scope of the present invention as defined in the following claims.

What is claimed is:

1. A motor operated compressor, comprising:
   a housing;
   a compressor provided in the housing;
   a motor connected to the compressor and configured to drive the compressor;
   an inverter coupled to a front side of the housing, and connected to the motor in an electrically conductive manner;
   a hermetic terminal assembly, one side of which extends into the inverter, and an opposite side of which extends into the housing;
   a plurality of busbars, one end of each of which is connected to the opposite side of the hermetic terminal assembly, and an opposite end of each of which is connected to the motor; and
   a first insulating cover portion configured to enclose and seal the hermetic terminal assembly and the plurality of busbars inside the housing,
   wherein each of the busbars is respectively provided with a connection portion configured to be connected to a lead wire of a winding coil provided in the motor unit,
   wherein an end portion of the connection portion extends outside the first insulating cover portion,
   wherein the end portion of the connection portion is enclosed and sealed by a second insulating cover portion,
   wherein the second insulating cover portion comprises:
      an outer wall portion protruding toward the inverter from an outer circumference of the motor, the outer wall portion including a receiving groove configured to accommodate the end portion of the connection portion; and
      a sealing cover coupled to the outer wall portion, and
   wherein the end portion of the connection portion is sealed by the first insulating cover portion, the sealing cover, and the outer wall portion.

2. The motor operated compressor of claim 1, wherein the hermetic terminal assembly comprises:
   a body member provided inside the housing, and inserted into a through hole in the front side of housing such that one side of the body member faces the inverter unit and an opposite side of the body member faces an inside of the housing;
   a hollow insulating member passing through the body member; and
   a conductive member enclosed by the insulating member, one end of the conductive member protruding from the one side of the body member, and an opposite end of the conductive member protruding from the opposite side of the body member and configured to be connected to the one end of one of the busbars, and wherein the first insulating cover portion encloses the body member along an outer circumferential surface of the body member.

3. The motor operated compressor of claim 1, wherein the outer wall portion includes a coupling protrusion portion protruding in an axial direction, and wherein the sealing cover includes a coupling concave portion recessed in the axial direction and configure to be coupled to the coupling protrusion portion.

4. A motor operated compressor, comprising:

a housing;

a compressor provided in the housing;

a motor connected to the compressor and configured to drive the compressor;

an inverter coupled to a front side of the housing, and connected to the motor in an electrically conductive manner;

a hermetic terminal assembly, one side of which extends into the inverter, and an opposite side of which extends into the housing;

a plurality of busbars, one end of each of which is connected to the opposite side of the hermetic terminal assembly, and an opposite end of each of which is connected to the motor; and a first insulating cover portion configured to enclose and seal the hermetic terminal assembly and the plurality of busbars inside the housing, wherein the hermetic terminal assembly comprises:

a body member provided inside the housing, and inserted into a through hole in the front side of housing such that one side of the body member faces the inverter unit and an opposite side of the body member faces an inside of the housing;

a hollow insulating member passing through the body member; and a conductive member enclosed by the insulating member, one end of the conductive member protruding from the one side of the body member, and an opposite end of the conductive member protruding from the opposite side of the body member and configured to be connected to the one end of one of the busbars, wherein the first insulating cover portion encloses the body member along an outer circumferential surface of the body member, and further comprising:

a plate including a plate hole configured to accommodate the insulating member and cover the through hole;

a first annular step portion recessed to a predetermined depth along an outer circumference of the through hole on the front side of the housing;

a second annular step portion recessed to a predetermined depth along an outer circumference of one side of the body member; and a first annular sealing member having a first side surface and a second side surface opposite the first side surface, wherein the first annular sealing member is positioned such that an outer circumferential portion of the first side surface is supported by the first step portion, an inner circumferential portion of the first side surface is supported by the second step portion, and the second side surface is supported by the plate.

5. The motor operated compressor of claim 4, wherein a first annular sealing groove is disposed in the first step portion and a second annular sealing groove is disposed in the second step portion, and second annular second sealing members are inserted into the first and the second annular sealing grooves, respectively.

6. The motor operated compressor of claim 5, wherein a height of an inner surface of the first annular sealing groove is lower than that of an outer surface of the first annular sealing groove, and a height of an outer surface of the second annular sealing groove is lower than that of an inner surface of the second annular sealing groove.

7. The motor operated compressor of claim 6, wherein the front side of the housing includes a first bolt hole spaced apart from the first step portion by a predetermined distance from the first step portion, the plate includes a second bolt hole corresponding to the first bolt hole, and the plate is coupled to the housing by a bolt accommodated in the first and second bolt holes.

8. The motor operated compressor of claim 7, further including a separation prevention wall disposed between the first step portion and the first bolt hole.

9. A motor operated compressor, comprising:

a housing;

a compressor provided in the housing;

a motor connected to the compressor and configured to drive the compressor;

an inverter coupled to a front side of the housing, and connected to the motor in an electrically conductive manner;

a plurality of conductive members, first sides of which protrude into the inverter unit, and second sides of which protrude into the housing;

a plurality of insulating members configured to enclose the plurality of conductive members;

a plurality of busbars having first ends connected to the second sides of the conductive members, respectively, the second ends of the busbars being connected to the motor; and an insulating cover portion inserted into a through hole in the front side of the housing such that one side of the insulating cover portion faces and inverter and is configured to enclose and seal the plurality of conductive members, the plurality of insulating members, and the plurality of busbars inside the housing, wherein each of the plurality of busbars includes a connection portion connected to a lead wire of a winding coil provided in the motor, and wherein an end portion of the connection portion extends outside the insulating cover portion, and further comprising:

an outer wall portion protruding toward the inverter unit from an outer circumference of the motor unit, the outer wall portion including a receiving groove configured to accommodate the end portion of the connection portion; and a sealing cover coupled to the outer wall portion, wherein the end portion of the connection portion is sealed by the insulating cover portion, the sealing cover, and the outer wall portion.

10. The motor operated compressor of claim 9, comprising:

a plate including a plate hole configured to accommodate the insulating member and cover the through hole;

a first annular step portion recessed to a predetermined depth along an outer circumference of the through hole on the front side of the housing;

a second annular step portion recessed to a predetermined depth along an outer circumference of one side of the insulating cover portion; and
a first annular sealing member having a first side surface and a second side surface opposite the first side surface, wherein the first annular sealing member is positioned such that an outer circumferential side of the first side surface is supported by the first step portion, an inner circumferential side of the first side surface is supported by the second step portion, and the second side surface is supported by the plate.

* * * * *